(12) United States Patent
Morris et al.

(10) Patent No.: US 8,288,721 B2
(45) Date of Patent: Oct. 16, 2012

(54) IMAGING AND SENSING BASED ON MUON TOMOGRAPHY

(75) Inventors: Christopher L. Morris, Los Alamos, NM (US); Alexander Saunders, Los Alamos, NM (US); Michael James Sossong, Los Alamos, NM (US); Larry Joe Schultz, Los Alamos, NM (US); J. Andrew Green, Los Alamos, NM (US); Konstantin N. Borozdin, Los Alamos, NM (US); Nicolas W. Hengartner, Los Alamos, NM (US); Richard A. Smith, San Diego, CA (US); James M. Colthart, Poway, CA (US); David C. Klugh, Black Diamond, WA (US); Gary E. Scoggins, Issaquah, WA (US); David C. Vineyard, Coronado, CA (US)

(73) Assignees: Decision Sciences International Corporation, Poway, CA (US); Los Alamos National Security, LLC, Los Alamos, NM (US)

( * ) Notice: Subject to any disclaimer, the term of this patent is extended or adjusted under 35 U.S.C. 154(b) by 607 days.

(21) Appl. No.: 12/108,494

(22) Filed: Apr. 23, 2008

(65) Prior Publication Data

US 2008/0315091 A1 Dec. 25, 2008

Related U.S. Application Data

(60) Provisional application No. 60/926,054, filed on Apr. 23, 2007.

(51) Int. Cl.
*G01N 23/00* (2006.01)

(52) U.S. Cl. ........ 250/306; 250/251; 250/307; 250/308; 250/358.1; 250/390.01; 340/600

(58) Field of Classification Search .................. 250/251, 250/306, 308, 397, 307, 336.1, 390.01, 358.1; 340/600

See application file for complete search history.

(56) References Cited

U.S. PATENT DOCUMENTS

| | | | | |
|---|---|---|---|---|
| 5,412,703 | A * | 5/1995 | Goodenough et al. | 378/8 |
| 6,766,048 | B1 * | 7/2004 | Launay et al. | 382/154 |
| 7,327,913 | B2 | 2/2008 | Shpantzer et al. | |
| 7,426,035 | B2 | 9/2008 | Shpantzer | |
| 7,470,905 | B1 * | 12/2008 | Goldberg et al. | 250/358.1 |
| 7,471,291 | B2 * | 12/2008 | Kaufman et al. | 345/424 |
| 7,483,600 | B2 | 1/2009 | Achiam et al. | |

(Continued)

FOREIGN PATENT DOCUMENTS

JP 2005276010 A * 10/2005

OTHER PUBLICATIONS

Borozdin, K., et al., "Cosmic-Ray Muon Tomography and Its Application to the Detection of High-Z Materials," *Proceedings of the 46th Annual Meeting, Institute of Nuclear Materials Management*, pp. 1-8, (2005).

(Continued)

*Primary Examiner* — Michael Logie
(74) *Attorney, Agent, or Firm* — Perkins Coie LLP

(57) ABSTRACT

Techniques, apparatus and systems for detecting particles such as muons for imaging applications. Subtraction techniques are described to enhance the processing of the muon tomography data.

7 Claims, 23 Drawing Sheets

U.S. PATENT DOCUMENTS

| | | | |
|---|---|---|---|
| 7,488,934 B2 * | 2/2009 | Bryman | 250/266 |
| 7,502,118 B2 | 3/2009 | Shpantzer | |
| 7,531,791 B2 * | 5/2009 | Bryman | 250/266 |
| 7,652,254 B2 * | 1/2010 | Shpantzer et al. | 250/358.1 |
| 2004/0096143 A1 | 5/2004 | Shpantzer et al. | |
| 2006/0098773 A1 * | 5/2006 | Peschmann | 378/57 |
| 2006/0180753 A1 | 8/2006 | Bryman | |
| 2006/0210131 A1 * | 9/2006 | Wheeler et al. | 382/128 |
| 2007/0019788 A1 * | 1/2007 | Ledoux et al. | 378/88 |
| 2007/0102648 A1 * | 5/2007 | Shpantzer et al. | 250/394 |
| 2007/0115475 A1 | 5/2007 | Shpantzer | |
| 2007/0127030 A1 | 6/2007 | Shpantzer | |
| 2007/0133918 A1 | 6/2007 | Cho et al. | |
| 2007/0140613 A1 | 6/2007 | Achiam et al. | |
| 2008/0025728 A1 | 1/2008 | Shpantzer et al. | |
| 2008/0043024 A1 * | 2/2008 | Schiwietz et al. | 345/442 |
| 2008/0128604 A1 | 6/2008 | Bryman | |
| 2008/0159758 A1 | 7/2008 | Shpantzer et al. | |
| 2008/0212970 A1 | 9/2008 | Shpantzer | |
| 2008/0228418 A1 * | 9/2008 | Green | 702/81 |
| 2009/0224157 A1 * | 9/2009 | Goldberg et al. | 250/358.1 |
| 2009/0295576 A1 * | 12/2009 | Shpantzer et al. | 340/540 |
| 2010/0065745 A1 | 3/2010 | Goldberg et al. | |

OTHER PUBLICATIONS

Fessler, J.A., "Penalized Maximum-Likelihood Image Reconstruction Using Space-Alternating Generalized EM Algorithms," *IEEE Transactions on Image Processing*, 4(10):1417-1429, Oct. 1995.

Fessler, J.A., "Statistical Methods for Image Reconstruction," *NSS-MIC Short Course on Statistical Image Reconstruction Methods*, (annotated slides for attendees), 87 pages, Oct. 2004.

Gustafsson, J., "Tomography of Canisters for Spent Nuclear Fuel Using Cosmic-Ray Muons," *Uppsala University Neutron Physics Report*, Diploma Thesis, 36 pages, Oct. 2005.

Hengartner, N., et al., "Information Extraction for Muon Radiography," *IEEE Nuclear Science Symposium Conference Record*, vol. 1, pp. 11-15, Oct. 2005.

Jenneson, P.M., "Large Vessel Imaging Using Cosmic-Ray Muons," *Nuclear Instruments and Methods in Physics Research A*, 525(1-2):346-351, Jun. 2004.

Osterlund, M., et al., "Tomography of Canisters for Spent Nuclear Fuel," *Proceedings of Science: International Workshop on Fast Neutron Detectors and Applications*, pp. 1-8, Apr. 2006.

Schultz, L.J., et al., "Image Reconstruction and Material Z Discrimination via Cosmic Ray Muon Radiography," *Nuclear Instruments and Methods in Physics Research A*, 519(3):687-694, Mar. 2004.

Stanley, S.J., et al., "See inside: The development of a cosmic ray muon imaging system to aid the clean up of the UK's nuclear waste legacy," *Annals of Nuclear Energy*, 35(3):507-517, Mar. 2008.

International Search Report and Written Opinion dated Apr. 6, 2009 for International Application No. PCT/US2008/61352, filed Apr. 23, 2008 (8 pages).

* cited by examiner

IMAGING AND SENSING BASED ON MUON TOMOGRAPHY

CROSS-REFERENCE TO PROVISIONAL APPLICATION

This patent application claims priority to U.S. provisional patent application No. 60/926,054, entitled "MUON TOMOGRAPHY" and filed on Apr. 23, 2007, the entire disclosure which is incorporated by reference as part of the specification of this application.

STATEMENT REGARDING FEDERAL RIGHTS

This invention was made with government support under Contract No. DE-AC52-06NA25396 awarded by the U.S. Department of Energy. The government has certain rights in the invention.

BACKGROUND

This application relates to techniques, apparatus and systems for imaging and sensing based on muon tomography.

Cosmic ray tomography is a technique which exploits the multiple Coulomb scattering of highly penetrating cosmic ray-produced muons to perform non-destructive inspection of the material without the use of artificial radiation. The earth is continuously bombarded by energetic stable particles, mostly protons, coming from deep space. These particles interact with atoms in the upper atmosphere to produce showers of particles that include many short-lived pions which decay producing longer-lived muons. Muons interact with matter primarily through the Coulomb force having no nuclear interaction and radiating much less readily than electrons. Such cosmic ray-produced particles slowly lose energy through electromagnetic interactions. Consequently, many of the cosmic ray-produced muons arrive at the earth's surface as highly penetrating charged radiation. The muon flux at sea level is about 1 muon per $cm^2$ per minute.

As a muon moves through material, Coulomb scattering off of the charges of sub-atomic particles perturb its trajectory. The total deflection depends on several material properties, but the dominant effect is the atomic number, Z, of nuclei. The trajectories of muons are more strongly affected by materials that make good gamma ray shielding, such as lead and tungsten, and by special nuclear materials (SNMs), such as uranium and plutonium, than by materials that make up more ordinary objects such as water, plastic, aluminum and steel. Each muon carries information about the objects that it has penetrated. The scattering of multiple muons can be measured and processed to probe the properties of these objects. A material with a high atomic number Z and a high density can be detected and identified when the material is located, inside low-Z and medium-Z matter.

Coulomb scattering from atomic nuclei in a matter results in a very large number of small angle deflections of charged particles as the transit the matter. A correlated distribution function can be used to approximately characterize the displacement and angle change of the trajectory that depends on the density and the atomic charge of the material. As an example, this distribution function can be approximated as a Gaussian distribution. The width of the distribution function is proportional to the inverse of the momentum of the particle and the square root of the real density of material measured in radiation lengths. The correlated distribution function of cosmic ray-produced muons can provide information on materials in the paths of the muons with no radiation dose above the earth's background and proper detection of such cosmic ray-produced muons can be implemented in a way that is especially sensitive to selected materials to be detected such as good radiation shielding materials.

A muon tomography detection system can be configured to perform tomography of a target object under inspection based on scattering of muons by the target object and can be used as portal monitors at various locations, such as border crossing points, ports, roadway checkpoints and other security checkpoints, for detecting certain targeted objects such as smuggled nuclear materials. Muon tomography detector systems can be used jointly with or an alternative to other nuclear material detectors such as gamma or X ray detectors. Gamma and X ray detectors operate by directing Gamma and X ray radiation to a target and measuring penetrated Gamma and X ray radiation. Shielding of nuclear materials can reduce the count rates in the Gamma and X ray detectors and reduce the detection performance of Gamma and X ray detectors. Muon tomography detection systems can be configured to detect shielded nuclear materials and objects.

SUMMARY

This application discloses techniques, apparatus and systems for detecting particles such as muons. In one aspect, a particle detection system has a charged particle tracker having a plurality of particle detectors. The particle detectors can comprise drift cells arranged on sides of a volume to be scanned to enable tracking of incoming and outgoing charged particles passing through the volume. At least some of the drift cells can comprise neutron sensitive drift cells which include a neutron sensitive medium to enable concurrent detection of neutrons. In use, the system can both selectively detect any materials or devices, especially of high density, occupying the volume from multiple scattering of the charged particles and concurrently detect any unshielded neutron sources occupying the volume from neutrons emitted therefrom.

In another aspect, a particle detection system is described to include a first set of position sensitive muon detectors located on a first side of an object holding area to measure positions and directions of incident muons towards the object holding area, a second set of position sensitive muon detectors located on a second side of the object holding area opposite to the first side to measure positions and directions of outgoing muons exiting the object holding area, and a signal processing unit, which may include, e.g., a microprocessor, to receive data of measured signals of the incoming muons from the first set of position sensitive muon detectors and measured signals of the outgoing muons from the second set of position sensitive muon detectors. This signal processing unit is configured to analyze scattering behaviors of the muons caused by scattering of the muons in the materials within the object holding area based on the measured incoming and outgoing positions and directions of muons to obtain a tomographic profile or the spatial distribution of scattering centers within the object holding area. The obtained tomographic profile or the spatial distribution of scattering centers can be used to reveal the presence or absence of one or more objects in the object holding area such as materials with high atomic numbers including nuclear materials or devices. Each position sensitive muon detector can be implemented in various configurations, including drift cells such as drift tubes filled with a gas which can be ionized by muons. Such a system can be used to utilize natural cosmic ray-produced muons as the source of muons for detecting one or more objects in the object holding area. In one implementation, the signal processing unit is operable to subtract a reference cosmic muon image that represents a background of an object, cargo or vehicle under inspection in the object holding area from an obtained cosmic muon image of the object, cargo or vehicle under inspection to obtain a subtracted image; and process the subtracted image to determine whether the object, cargo or vehicle under inspection contains a target object that is absent from the reference cosmic muon image.

In another aspect, a method is provided for using natural cosmic muons as a radiation source to obtain muon tomographic images of an object, cargo or vehicle under inspection. This method includes obtaining one or more cosmic muon images of an object, cargo or vehicle under inspection; subtracting a reference cosmic muon image of a reference object, cargo or vehicle that represents a background of the object, cargo or vehicle under inspection from an obtained cosmic muon image of the object, cargo or vehicle under inspection to obtain a subtracted image; and processing the subtracted image to determine whether the object, cargo or vehicle under inspection contains a target object that is absent from the reference cosmic muon image.

In another aspect, a method of inspection using muon tomography, comprising: scanning a vehicle or cargo container using muon sensors to obtain muon tomography imaging data; creating a reconstruction of the vehicle or cargo container from the muon tomography imaging data; subtracting a reconstruction of a known background model for the vehicle or cargo container from the reconstruction of the vehicle or cargo container to obtained a subtracted image; and analyzing the subtracted image to detect whether a target object is present in the vehicle or cargo container.

In another aspect, a method of performing inspection includes scanning a subject using muon sensors; creating a digital reconstruction of the subject; and comparing the digital reconstruction of the subject to digital reconstructions of objects having known shapes.

In yet another aspect, a method of creating digital reconstructions using muon sensor data for a scanned object includes determining a closest approach point between incoming and outgoing trajectories; determining a closest approach distance between incoming and outgoing trajectories; determining the angle between the incoming and outgoing trajectories; and calculating the thickness of the material using the covariance of the angle and the closest approach distance.

These and other aspects and their exemplary implementations are described in detail in the attached drawings, the description and the claims.

DETAILED DESCRIPTION

Figure 1:
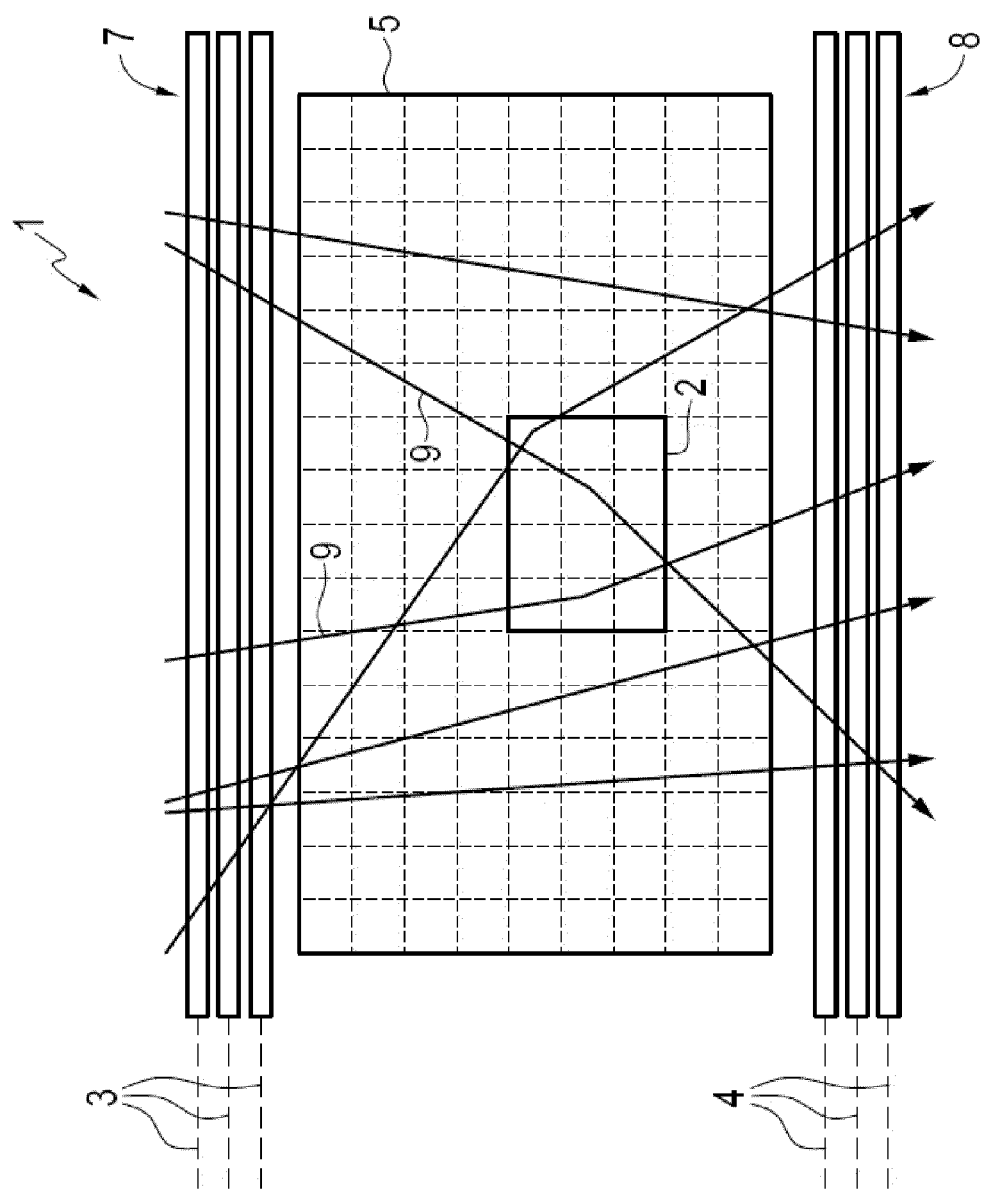
FIG. 1 illustrates an example of a muon tomography detection system utilizing cosmic ray-produced muons to detect an object.

The muon tomography detection techniques, apparatus and systems described in this application can be implemented to detect presence of certain objects or materials such as nuclear materials and to obtain tomographic information of such objects in various applications including but not limited to inspecting packages, containers, occupied vehicles at security check points, border crossings and other locations for nuclear threat objects that may range from fully assembled nuclear weapons to small quantities of highly shielded nuclear materials. The approach enables detection of shielded and unshielded nuclear material using a single detector system in a compact configuration to provide a cost effective way for detecting nuclear and other targeted devices and materials.

Features described in this application can be used to construct various muon tomography detection systems. For example, a muon tomography system can include an object holding area or volume for placing an object to be inspected, a first set of position sensitive muon detectors located on a first side of the object holding area to measure positions and directions of incident muons towards the object holding area, a second set of position sensitive muon detectors located on a second side of the object holding area opposite to the first side to measure positions and directions of outgoing muons exiting the object holding area, and a signal processing unit, which may include, e.g., a microprocessor, to receive data of measured signals of the incoming muons from the first set of position sensitive muon detectors and measured signals of the outgoing muons from the second set of position sensitive muon detectors. As an example, each of the first and second sets of particle detectors can be implemented to include drift tubes arranged to allow at least three charged particle positional measurements in a first direction and at least three charged particle positional measurements in a second direction different from the first direction. The signal processing unit is configured to analyze scattering behaviors of the muons caused by scattering of the muons in the materials within the object holding area based on the measured incoming and outgoing positions and directions of muons to obtain a tomographic profile or the spatial distribution of scattering centers within the object holding area. The obtained tomographic profile or the spatial distribution of scattering centers can be used to reveal the presence or absence of one or more objects in the object holding area such as materials with high atomic numbers including nuclear materials or devices. Each position sensitive muon detector can be implemented in various configurations, including drift cells such as drift tubes filled with a gas which can be ionized by muons. Such a system can be used to utilize natural cosmic ray-produced muons as the source of muons for detecting one or more objects in the object holding area. Various features of exemplary muon tomography detection systems are described in PCT Application No. PCT/US2007/082573 entitled "Particle Detection Systems and Methods" and filed on Oct. 25, 2007 (PCT Publication No. WO2008/123892), which is incorporated by reference as part of the specification of this application.

In some applications, the particle detection systems can utilize drift tubes to enable tracking of charged particles, such as muons, passing through a volume. However, those skilled in the art would understand that such charge particle detectors can be employed in applications other than cosmic ray-produced charged particle tracking to detect charged particles other than cosmic ray-produced charged particles. These charged particle detectors are applicable to any charged particle from any appropriate source. For example, muons can be produced by cosmic rays or a low intensity beam of muons from an accelerator.

Cosmic ray-produced muons can provide information with no radiation dose above the earth's background and proper detection of such cosmic ray-produced muons can be implemented in a way that is especially sensitive to good shielding materials. A muon detection system can be configured to perform tomography of a target object under inspection based on scattering of muons by the target object. The system can be configured to perform tomography to localize scattering (RC & LS). The tomographic position resolution can be expressed approximately as follows:

$$\Delta x = \theta_{RMS} L \quad \text{Eq. 1}$$

where:
$\theta_{RMS}$=the root-mean-square (rms) of the scattering angle, and
L=the size of the volume under the detection by the detection apparatus.

For example, for an exemplary rms scattering angle of 0.02 radian and an apparatus size of 200 cm, the tomographic position resolution is 0.02×200 cm=4 cm.

In one approach, the angular resolution is determined by the following equation based on the Poisson statistics:

$$\frac{\Delta \theta}{\theta} = \frac{1}{\sqrt{2N}} \quad \text{Eq. 2}$$

where:
θ=the rms scattering angle,
N=number of cosmic ray-produced muons passing through a region of interest.

For example, the angular resolution for N=100 (corresponding to a 10×10 cm² resolution element after one minute of counting is Δθ=0.07θ.

Table 1 illustrates theoretical energy loss rate (dE/dx) and radiation length (X) for various materials. One minute of counting distinguishes a 10 cm cube of iron from a 10 cm cube of lead at 6 standard deviations on the basis of their different values of X.

TABLE 1

| Material | dE/dx MeV-cm²/gm | X cm |
|---|---|---|
| H₂O | 2.06 | 36 |
| Fe | 1.87 | 1.76 |
| Pb | 1.54 | 0.56 |

Tomographic methods, designed to construct an image or model of an object from multiple projections taken from different directions, can be implemented in the cosmic ray system to provide a discrete tomographic reconstruction of the volume of interest based on the data provided by the muons. In some implementations, Monte Carlo simulation techniques can be used to study applications and shorten scanning times. Other stochastic processing methods may also be used in implementing the muon tomographic imaging described in this application.

The cosmic ray radiography function of the particle detection systems of the embodiments can be more readily understood with reference to examples of detection systems adapted to detect muons.

FIG. 1 illustrates a muon tomography detection system 1 utilizing cosmic ray-produced muons to detect an object. The system 1 includes a set of two or more planes 3 of position-sensitive muon detectors 7 arranged above an object holding area or volume 5 to be imaged for providing the position and angles (i.e., directions in the 3-D space) of incoming muon tracks 9. The muon detectors 7 are configured to measure the position and angles of incoming muon tracks 9 with respect to two different directions, e.g., in two orthogonal coordinates along x and y axes. Muons pass through the volume 5 where the object 2 may be located and are scattered to an extent dependent upon the material 2 occupying the volume through which they pass. Another set of two or more planes 4 of position-sensitive muon detectors 8 are configured to record outgoing muon positions and directions. The drift tubes in detectors 7 and 8 are arranged to allow at least three charged particle positional measurements in a first direction and at least three charged particle positional measurements in a second direction which is different from the first direction and may be orthogonal to the first direction. Side detectors (not shown) may be used to detect more horizontally orientated muon tracks. The scattering angle of each muon is computed from the incoming and outgoing measurements.

A signal processing unit, e.g., a computer, is provided in the system 1 to receive data of measured signals of the incoming muons by the detectors 7 and outgoing muons by the detectors 8. This signal processing unit is configured to analyze the scattering of the muons in the volume 5 based on the measured incoming and outgoing positions and directions of muons to obtain a tomographic profile or the spatial distribution of the scattering density reflecting the scattering strength or radiation length within the volume 5. The obtained tomographic profile or the spatial distribution of the scattering density within the volume 5 can reveal the presence or absence of the object 2 in the volume 5. FIG. 1 shows that drift tube detectors 7 and 8 are located on top and bottom sides of the volume 5. In some implementations, additional drift tube detectors can be implemented on sides of the volume 5 to form a box or four sided structure into which a package, a vehicle or cargo container can enter for scanning by the system.

The processing of measurements for cosmic ray-produced muons in a volume under inspection (e.g., a package, a container or a vehicle) by the processing unit for the system 1 in FIG. 1, and other systems described in this application can include reconstructing the trajectory of a muon through the volume 5, measuring the momentum of an incoming muon based on signals from the detectors 7, measuring the momentum of an outgoing muon based on signals from the detectors 8, and determining the spatial distribution of the scattering density of the volume 5. These and other processing results can be used to construct the tomographic profile and measure various properties of the volume 5.

For example, the reconstruction of the trajectory of a muon particle passing through a detector 7 or 8 having a set of drift tubes in FIG. 1 can include (a) receiving hit signals representing identifiers of drift cells hit by charged particles and corresponding hit times; (b) grouping in-time drift cell hits identified as being associated with a track of a particular charged particle passing through the detector; (c) initially estimating time zero for the particular charged particle; (d) determining drift radii based on estimates of time zero, drift time conversion data and the time of the hit; (e) fitting linear tracks to drift radii corresponding to a particular time-zero; and (f) searching and selecting a time-zero value associated with the best of the track fits performed for particular charged particle and computing error in time-zero and tracking parameters. Such reconstruction of the track based on the time zero fit provides a reconstructed linear trajectory of the charged particle passing through the charged particle detector without having to use fast detectors (such as photomultiplier tubes with scintillator paddles) or some other fast detector which detects the passage of the muon through the apparatus to the nearest few nanoseconds to provide the time-zero. Implementations for reconstruction of the trajectory of a muon particle are described in PCT Application No. PCT/US2007/082731 entitled "Determination of Trajectory of A Charged Particle" and filed on Oct. 26, 2007 (PCT Publication No. WO2008/118208), which is incorporated by reference as part of the specification of this application.

For another example, the processing for measuring the momentum of an incoming or outgoing muon based on signals from the detectors 7 or 8 in FIG. 1 can include (a) configuring a plurality of position sensitive detectors to scatter a charged particle passing therethrough; (b) measuring the scattering of a charged particle in the position sensitive detectors, wherein measuring the scattering comprises obtaining at least three positional measurements of the scattering charged particle; (c) determining at least one trajectory of the charged particle from the positional measurements; and (d) determining at least one momentum measurement of the charged particle from the at least one trajectory. This technique can be used to determine the momentum of the charged particle based on the trajectory of the charged particle which is determined from the scattering of the charged particle in the position sensitive detectors themselves without the use of additional metal plates in the detector. Implementations of techniques for determining the momentum of a muon particle are described in PCT Application No. PCT/US2007/082752 entitled "Measuring Momentum for Charged Particle Tomography" and filed on Oct. 26, 2007 (PCT Publication No. WO2008/140559), which is incorporated by reference as part of the specification of this application.

For yet another example, the spatial distribution of the scattering density of the volume 5 in FIG. 1 can be determined from charged particle tomographic data by: (a) obtaining predetermined charged particle tomography data corresponding to scattering angles and estimated momentum of charged particles passing through object volume; (b) providing the probability distribution of charged particle scattering for use in an expectation maximization (ML/EM) algorithm, the probability distribution being based on a statistical multiple scattering model; (c) determining substantially maximum likelihood estimate of object volume density using the expectation maximization (ML/EM) algorithm; and (d) outputting reconstructed object volume scattering density. The reconstructed object volume scattering density can be used to identify the presence and/or type of object occupying the volume of interest from the reconstructed volume density profile. Various applications include cosmic ray-produced muon tomography for various homeland security inspection applications in which vehicles or cargo can be scanned by a muon tracker. Implementations of techniques for determining the spatial distribution of the scattering density of a volume are described in PCT Application No. PCT/US2007/082753 entitled "Statistical Tomographic Reconstruction based on Measurements of Charged Particles" and filed on Oct. 26, 2007 (PCT Publication No. WO2008/140560), which is incorporated by reference as part of the specification of this application.

The tomographic processing part of the signal processing unit may be implemented in a computer at the same location as the detectors 7 and 8. Alternatively, the tomographic processing part of the signal processing unit may be implemented in a remote computer that is connected on a computer network such as a private network or a public network such as the Internet.

Thus, multiple scattering of cosmic ray-produced muons can be used to selectively detect high z-material in a background of normal cargo. Advantageously, this technique is passive, does not deliver any radiation dose above background, and is selective of high-z dense materials. As a muon traverses matter, it encounters Coulomb forces from each nucleon it passes and is deflected by the Coulomb forces. Each muon can be measured to provide the scattering angle of the muon trajectory as a measure of the integrated nuclear density along its path, the thickness of the material through which the muon has passed based on the distance of closest approach between linear extrapolations of the trajectory of the muon as it enters and leaves the volume of interest, and the location along the muons path where the scattering occurred as the point of closest approach between linear extrapolations of the muon's trajectory as it entered and left the volume of interest. Three-dimensional representations of the nuclear density in the volume of interest are generated from muon scattering data. The resolution of this reconstruction is determined by the number of muons passing through each resolution element (voxel). Studies have shown that in most scenes, approximately 7 to 10 muons traversing a voxel may be sufficient to distinguish at the 2 level between low-Z filled voxels (concrete, water), medium-Z filled voxels (iron, copper) and high-Z filled voxels (tungsten, uranium). As an example, 5 cm voxels are traversed by 7 to 10 muons in approximately 20 seconds.

Figure 2:
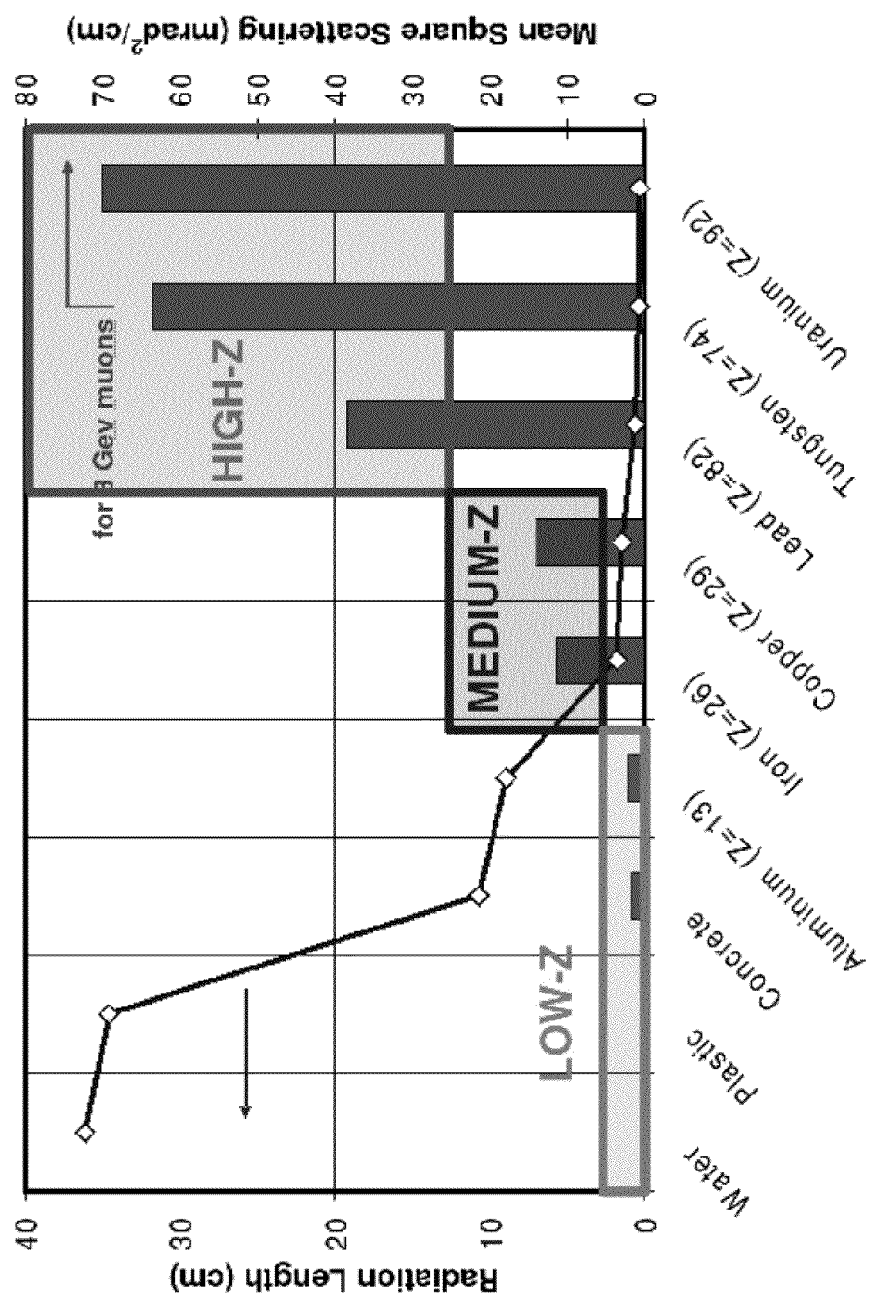
FIG. 2 shows examples of signal strengths from various materials as reconstructed by a muon tomography detection system showing significant differences between special nuclear materials (SNMs) or dense shielding materials and common background component materials.

FIG. 2 shows signal levels from different categories of materials with different Z values where the minimum scan times are set at 15 seconds to ensure decisions are not made without significant muon exploration of the voxel space. These materials are divided into three Z groups as shown in FIG. 2: low-Z group, medium-Z group and high-Z group.

When reconstructions are performed on short exposure datasets (e.g., several voxels traversed by less than a few muons), it is common for the large integrated scattering from thick, medium-Z objects to be placed in a single voxel. For longer exposures that produce several muons traversing the entire large medium-Z object across several voxels, the nuclear density can properly distribute over the volume of the object. With low threat density thresholds, it is common for these short exposure reconstructions to be found threatening, extending the average time it takes to clear innocuous scenes. The implementation of certain background subtraction algorithms mitigates this issue, greatly reducing the average time to clear innocent scenes. Examples for background subtraction algorithms are described after the following sections on additional details in implementing the muon tomography system in FIG. 1.

Figure 3:
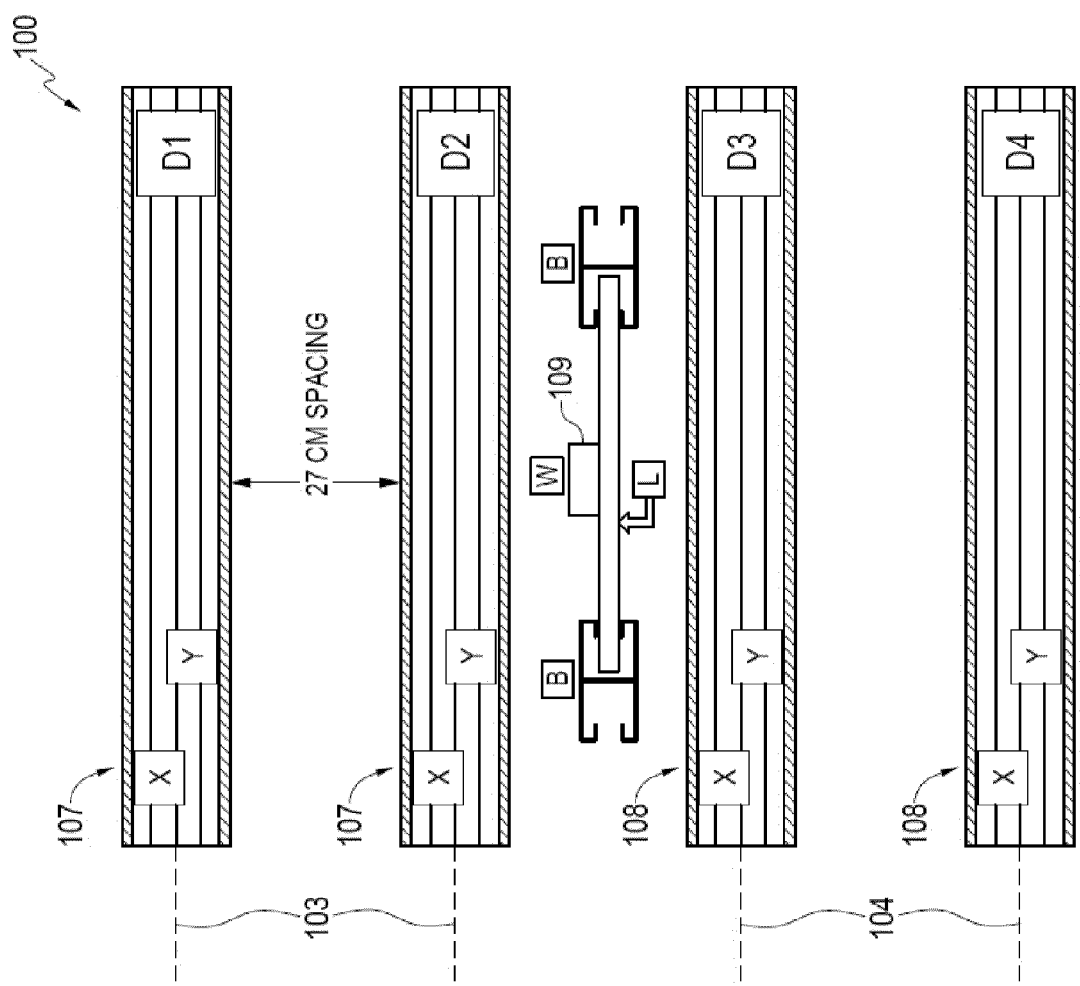
FIG. 3 illustrates a side view of another example of a muon tomography detection system utilizing cosmic ray-produced muons to detect an object.

FIG. 3 illustrates a side view of a muon tomography detection system 100 utilizing cosmic rays to detect an object. The system 100 has two planes 103 of muon detectors 107 located above the sample 109 and two planes 104 of muon detectors 108 located below the sample 109. In this particular example, the planes of muon detectors are separated by 27 cm spacings.

Figure 4:
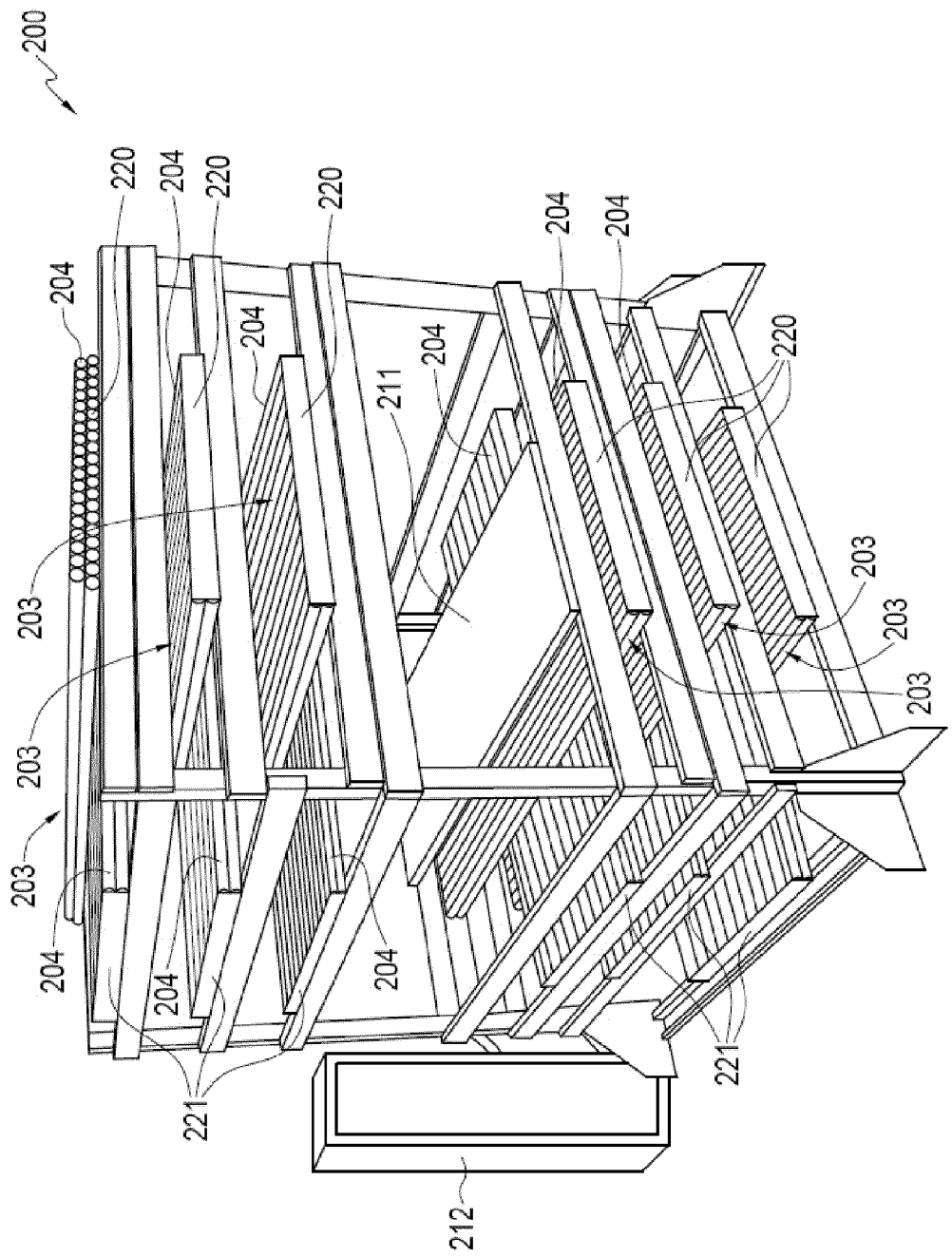
FIG. 4 illustrates a detailed perspective view of another example of a detection system utilizing cosmic ray-produced muons to detect an object.

FIG. 4 illustrates a detailed perspective view of a charged particle detection system 200 suitable for muon tomography. Position sensitive detectors 203 are arranged above the sample holder plane 211 in the sample holding area or volume and position sensitive detectors 203 are arranged below the sample holder plane 211. Each set of position sensitive detectors comprises a first double-layer 220 of drift tubes 204 arranged in the X direction and a second double-layer 221 of drift tubes 204 arranged in the Y direction. In each of the layers 220, 221, the drift tubes 204 are arranged in two rows, offset by half a tube diameter from each other.

Drift tube modules 204 are operable to detect cosmic ray muons and may also be configured to detect gamma rays in addition to muons. In the system 200, the drift tube modules are 12 foot long aluminum drift tubes which are configured to measure the position and angle of incoming and outgoing muon tracks in X and Y coordinate directions. The aluminum in the detectors provides a considerable amount of mass in which gamma rays and energetic electrons are absorbed or scattered. The energetic electrons produced in these processes are detected locally in the drift tubes in the same way that more energetic cosmic rays are detected.

The tubes can be arranged in different ways. For example, the layers need not have to be 90 degrees from one another, but can be smaller non-zero angles. Also by way of example, the top layer could be at 0 degrees, middle layer at 45 degrees from the first, and a third layer 90 degrees from the first. This would allow resolution of multiple tracks that occur at the same instance of time.

Also, other position sensitive detector arrangements capable of scattering the charged particle passing therethrough and providing a total of at least three individual positional measurements can be adopted instead of the arrangement of detectors of FIG. 4. At least 3 position measurements are obtained to enable a line fit with a free parameter in tracking the particle.

One example of the data acquisition electronics 212, operably coupled to the drift tubes, will now be described. Drift tubes of the detector system 200 of FIG. 4 are connected to respective electronic amplifiers (not shown) which increase the voltage of the deposited signal (associated with a cosmic ray muon passing through a drift tube). For each drift channel, the amplified signal is turned into a digital signal with a piece of electronics called a discriminator (on if there is a hit, off if no hit), which preserves the precise time of the hit. This combination of amplifier and discriminator is the "front-end" electronics. The time and channel number that the digital signal is registered to the nearest nanosecond by the time-to-digital-converters (TDCs) mentioned above. Each drift tube has its own front-end electronics and TDC.

The front-end electronics may be built using hardware composed of off-the-shelf (OTS) parts. For example, the TDC can be OTS and each TDC unit can be configured to have the capability of 128 input channels (drift tubes in our case), and store the time of the hit digitally. These units can have a buffer for holding about 32,000 hits. In operation, the TDCs are read-out about 5 times per second with a custom data-acquisition system (DAQ). The TDCs sit in a Versa Module Eurocard VME crate with a SIS 1100 controller, made by Struck Innovative Systeme GmbH (SIS), which provides the computer interface. The DAQ runs on a personal computer, with an optical cable to interface with the SIS 1100 to command the TDCs for the data transfer. Once the hit times and channel numbers are read out into the memory of the PC, the raw data is stored on hard drive, but the data is also processed to identify the cosmic ray events. The track data, and pertinent diagnostic data are also stored on the hard drive. The processing of measurements for cosmic ray-produced muons in a volume under inspection (e.g., a package, a container or a vehicle) by the data acquisition unit of the system of FIG. 4, or other signal processing unit linked thereto, can be similar to those explained above for the system of FIG. 1. For example, processing measurements may be reconstructing the trajectory of a muon through the volume, measuring the momentum of an incoming muon based on signals from the detectors, measuring the momentum of an outgoing muon based on signals from the detectors, and determining the spatial distribution of the scattering density of the volume.

Advantageously, system 200 can be configured to selectively detect high density shielding of radioactive material occupying the volume from multiple scattering of the cosmic ray-produced muons whilst also counting gamma rays emitted from the radioactive material. In addition to detecting high density materials, such as lead, gold, tungsten, uranium and plutonium, the system can be employed to detect medium density materials, such as steel, iron and copper, and also low density materials, such as water, plastic, concrete and aluminum, albeit with a somewhat lower accuracy than for high density materials.

In one implementation, the drift tube module can be cylindrical and filled with a detector gas such as Argon-Isobutane 230 to enable detection of the cosmic ray-produced charged particles, such as muons. The system is configured to apply a positive high voltage of about +2-3 kV to a central anode wire extending along the length of the cylindrical tube with the tube at ground so that a high-voltage static field is also present. When the charged particle interacts with gas atoms, many electrons are liberated from those atoms along the charged particle's straight line path through a chord of the tube. The static field causes the "string" of electrons to drift toward the positively charged anode wire which is read-out electronically with TDCS (time-to-digital converters) of the data acquisition electronics. The detector gas in the drift tube can be, for example, Argon-Isobutane or other operating gas mixtures such as Argon/carbon dioxide or Argon/isobutane/carbon dioxide. The detector gas can include hydrocarbons such as methane, propane, pentane and the like. An example of an operating gas mixture is 10% methane, 90% argon. Furthermore, non-flammable gas mixtures such as Argon-carbon-dioxide-tetrafluoromethane ($CF_4$) may alternatively be employed as the operating gas. Also, ethane or other gases may be adopted in the gas mixtures. For example, a mixture of 5% of ethane, 45% of CF4 and 50% of Argon is a suitable non-flammable operating gas. Inert gases other than Argon can be used in the gas mixture. Aluminum and other materials such as carbon composite with internal conductive coatings can be used to construct the drift tubes. The drift tubes may have circular cross-sections or other cross section geometries. For example, the drift tubes may be constructed from aluminum extrusions with multiple, non-circular cross-sections. Alternatively, drift cells other than drift tubes can be adopted such as for example triangular shaped drift cells.

Figure 5:
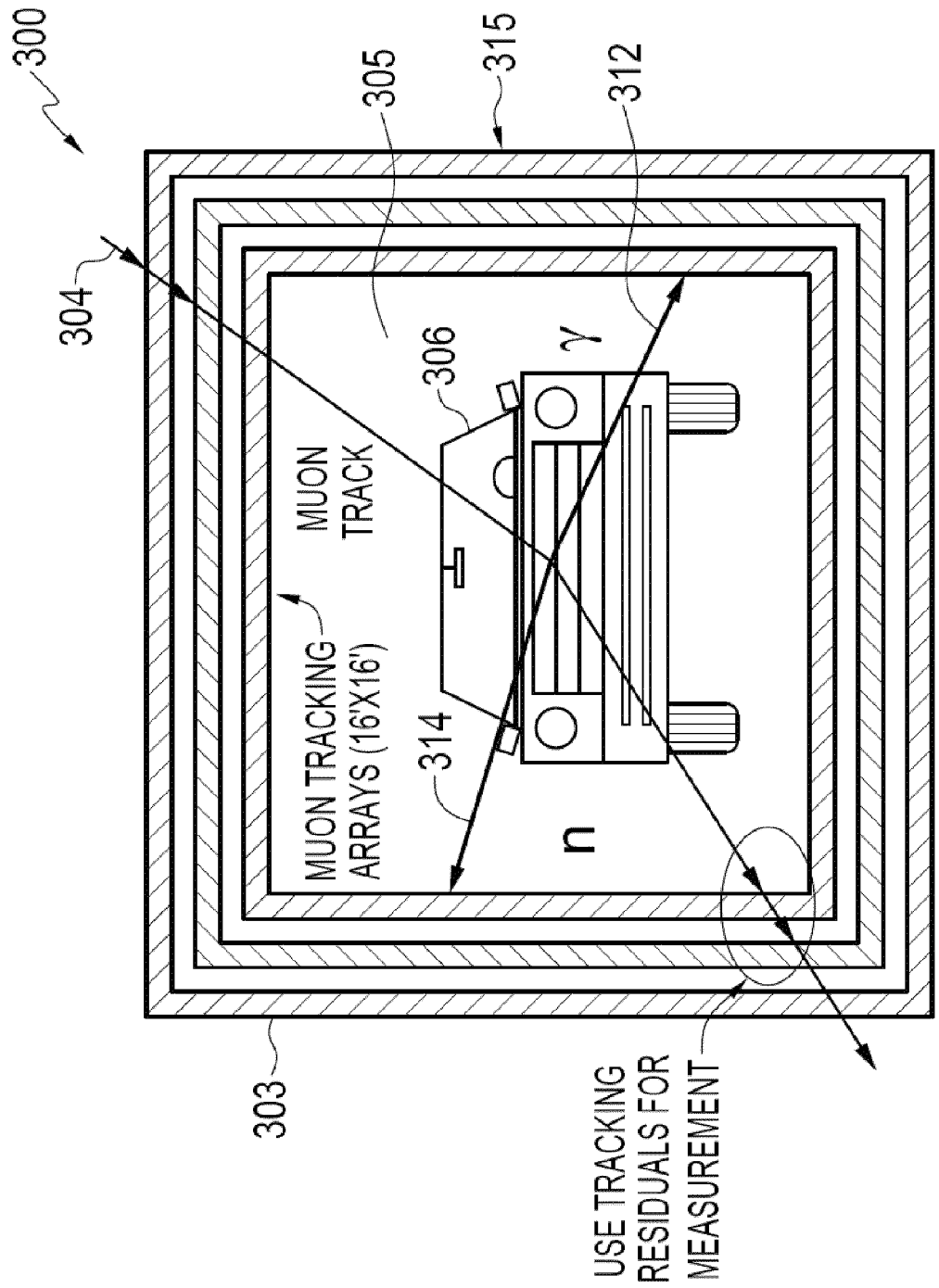
FIG. 5 illustrates a muon tomography detection system adapted and arranged to monitor cargo in vehicles and containers.

FIG. 5 illustrates an example of a particle detection system 300 adapted and arranged to monitor cargo in vehicles and containers based on muon tomography at various security check points such as ports and border crossings. The system 300 uses a muon tomography system with a plurality of detector drift tubes 303 configured to track cosmic ray-produced muons 304 scattered by the cargo or contents of a vehicle 306 occupying the volume 306 and configured to concurrently detect any neutrons 314 emitted from the vehicle contents. The system 300 can be employed for inspecting occupied vehicles at border crossings for nuclear threat objects which might range from fully assembled nuclear weapons to small quantities of highly shielded nuclear materials. The system 300 can be used to pass innocent vehicles in less than 30 seconds, detect several Kgs of highly enriched uranium (HEU) in less than 60 seconds (shielded or unshielded) and detect plutonium or HEU nuclear devices in less than 60 seconds (shielded or unshielded).

Both plutonium and weapons grade uranium are sources of neutrons either from the amplification of the natural neutron background ("fission chains") or from individual spontaneous fissions within the material. The particle tracking system 300 is similar in construction to the system 200 of FIG. 4 and in the system 300 the drift tubes are arranged to form a box or four sided structure 315 around the volume to be scanned 305.

In one implementation, the drift tubes may be designed to include a neutron sensitive medium to enable the drift tubes to concurrently detect any neutrons emitted from the vehicle 306. The neutron sensitive medium can include Helium-3, Boron or Lithium and can be in solid, liquid or gas form. A hydrogenous material, such as hydrogenous organic materials (e.g., Polyethylene and paraffin) or water, can be used to trap and confine neutrons so that they pass through the drift cells multiple times and are isolated from the material or devices being scanned. Such a hydrogenous material can also moderate the neutron energy by slowing down the neutrons to increase their interaction cross-section by very large factors. Boron or a boron compound may be enriched in the isotope boron-10 and lithium or a lithium compound can be enriched in the isotope lithium-6. The operating gas of the drift tubes can comprise a mixture of argon and at least one gas selected from the group consisting of carbon dioxide, isobutane, tetrafluoromethane and ethane to enable counting of gamma rays such that, in use, the system can additionally detect any radioactive sources occupying the volume from gamma rays emitted therefrom.

The drift tubes may also be configured to include a gamma ray scattering solid material to enable detection of gamma rays. Helium-3 can be added to any of these gases to permit simultaneous neutron detection by the same drift tube. If the drift tube contains only argon and tetrafluoromethane then boron trifluoride, possibly advantageously enriched in the isotope boron-10, could be added to permit simultaneous neutron detection by the same drift tube. Alternatively, neutron detectors could utilize drift tubes optimized for that purpose, distinct from the tubes for detection of charged particles (muons).

The detection of neutrons can be achieved in many ways. In the illustrative example in FIG. 5, the operating gas of the tracking drift tubes 303 includes a partial pressure of Helium-3 (3He) which constitutes the neutron sensitive medium to enable the drift tubes to concurrently detect any neutrons. For example, the operating gas can be a combination of Helium-3 (3He), ethane, tetrafluoromethane and argon. The detector can also use Helium-3 (3He) in combination with other different sets of fill gases.

This combined use of cosmic muon ray detection and neutron detection function is illustrated in FIG. 5. The neutrons are seen in the normal electronics as much larger pulses than those of the muons. This is due to the high energy loss rate of the protons produced by neutron interaction with helium-3 or of the massive charged particles produced by neutron interaction with boron-10 or lithium-6. The drift tubes 303 can be sealed further to decrease cost and complexity of the system by eliminating the need for a gas handling system. The system can also be used to detect gamma rays 312 in the same manner as the system 200 of FIG. 4.

Using the drift tubes 303 to both passively count neutron and optionally gamma particles 314 emitted from the vehicle 306 and track the scattered cosmic ray-produced charged particles 304 (muons) enables the system to function as an efficient monitor of radiation emitted by threat objects in addition to cosmic ray imaging providing a more compact and cost effective detector system to look for nuclear devices and materials at border crossings and ports. Addition of the neutron sensitive medium to the tracking drift tubes 303 provides efficient selective neutron detection with no impact on muon tracking and allows detection of unshielded neutron sources in vehicles and containers. This has various benefits over using separate systems to detect neutrons and radiograph vehicles. For example, the single detector system is cheaper than several systems. For another example, the system takes up less space which is limited. As the third example, the detector system can provide positioning information about the neutron source, independent of the muon signal. A method of operating the particle detection system 300 of FIG. 11 according to one embodiment involves detecting with the drift tubes 303 incoming and outgoing cosmic ray-produced charged particles 304 together with any gamma rays 312. The multiple scattering of the charged particles are then computed to selectively detect material, particularly high density material, occupying the volume 305. Any neutron particles emitted from the volume 305 are counted by the data acquisition electronics (not shown) to detect if any unshielded neutron source is occupying the volume. Any gamma rays 312 emitted from the volume can also be counted by the data acquisition electronics to detect if any radioactive source is occupying the volume 305.

Alternatively or additionally, the neutron sensitive medium can be a solid layer or region of neutron sensitive material instead of a gas medium. A drift tube having an anode wire includes a conductive neutron sensitive layer disposed on the interior wall of the drift tube. The neutron sensitive layer can be for example a conductive compound of lithium or boron. The neutron sensitive layer 604 can be used in conjunction with or without helium-3 (3He) in the detector gas. In alternative embodiments, the drift tubes or other drift cells including neutron sensitive material need not be arranged to form a four sided structure as shown in FIG. 5. For example, the neutron sensitive drift tubes can be arranged to form a top and bottom side structure such as that of the detector system 200 of FIG. 4. In yet another alternative embodiment, a particle detection system (not shown) is provided which is identical to that of the particle detection system 300 of FIG. 5 with the exception that the system also includes a gamma ray and/or neutron source within the apparatus to enable active rather than only passive interrogation of the vehicle and thereby provide a detectable increase in the gamma ray and/or neutron counting rate.

Figure 6:
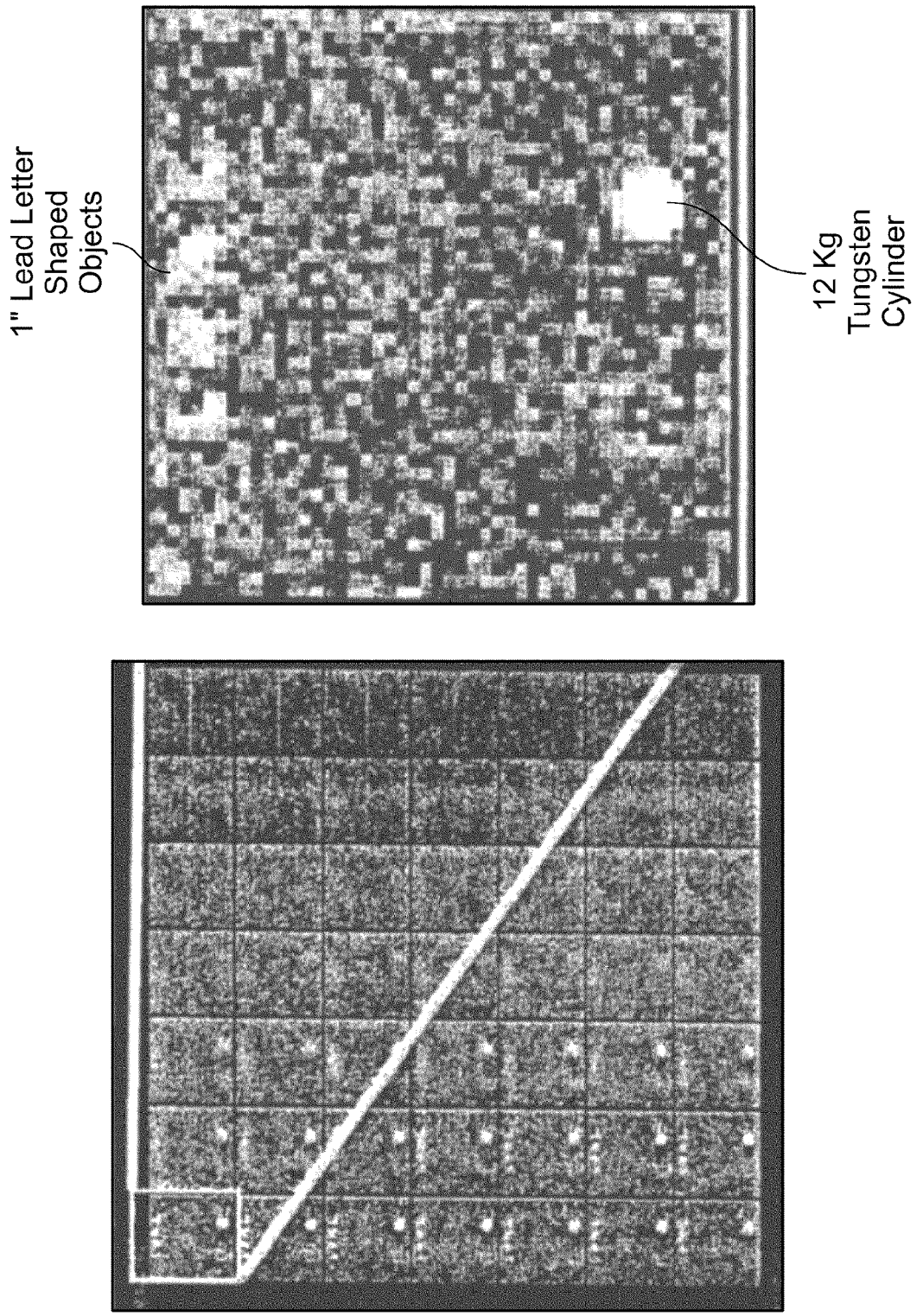
FIG. 6 shows an example of muon tomography images of a vehicle obtained from a muon tomography detection system.

FIG. 6 shows an example of muon tomography images of a vehicle obtained from a muon tomography detection system. The image on the left hand side is reconstructions in the xy plane at different elevations. The image on the right hand side shows a left upper corner area of the image on the left hand side where objects made of 1" think lead and shaped as letters L, A, N and L in a combination "LANL" are visible on the upper side. The lower visible object is a 12 Kg tungsten cylinder.

Muon tomography can produce simple grey-scale image that shows the location of regions of high scattering strengths. The shapes and sizes of such regions may be used to determine whether such regions represent a target object or a threat. If the scatterer is well resolved into voxels and has its full material density, it is possible to determine its Z number from the measured root-mean-square scattering angle. A few scattered muons can be sufficient to determine Z with an acceptable accuracy for distinguishing among the major groups of Z with high confidence.

Figure 7:
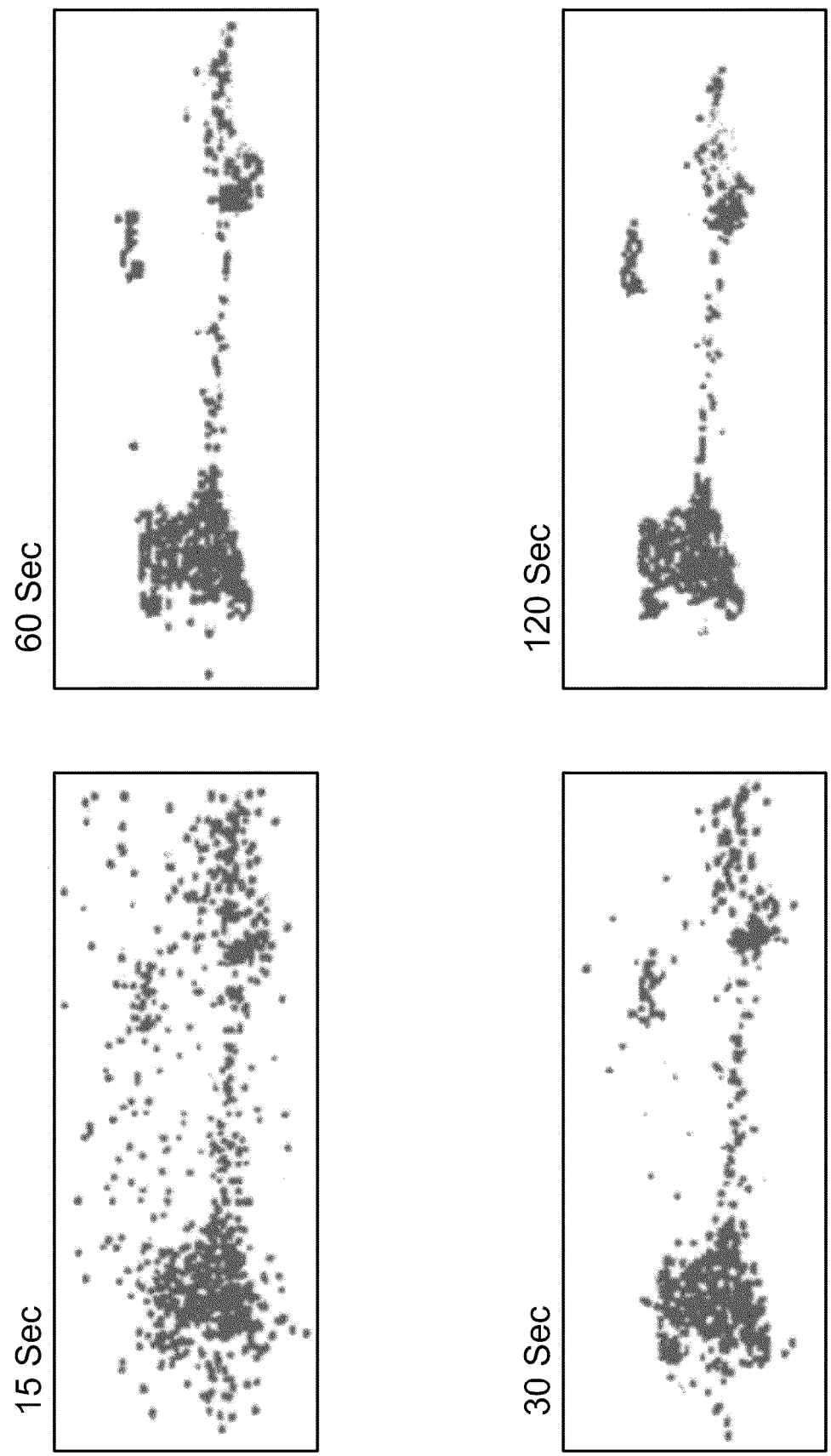
FIGS. 7 and 8 show additional examples of muon tomography images of vehicles obtained from a muon tomography detection system.

FIG. 7 shows additional examples of muon tomography images of vehicles from a muon tomography detection system. More specifically, FIG. 7 shows simulations of the detection of an M107 155-mm artillery shell in a van. Vehicle components, such as the engine, battery, drive train, axles, differential and frame, are visible and can be readily recognized. The shell becomes apparent after a short sampling period of 15 seconds for the signal integration. The shape of the shell sharpens as the data accumulate.

The scattering angles in muon tomography detection systems can be approximated by a Gaussian distribution. However, in practice, the actual distribution has an excess of large angle scattering due to single large angle scattering events with respect to a true Gaussian distribution. Hence, the use of the Gaussian distribution may lead to a spurious inference of the presence of a voxels filled with a material with a much higher z than actual Z. Such spurious higher Z voxels can be numerous of the tomographed volume contains a large volume of lower Z material.

One method to address this issue is to replace a mean value used in the maximum likelihood reconstruction method with a median value. The maximum likelihood reconstruction method based on the mean value can infer the presence of higher Z material from even a single large angle scattering event because a large angle scatter from a low Z material is exponentially unlikely. Such errors are single voxel errors and do not produce a contiguous multi-voxel region of spurious Z. Therefore, such errors may be removed by averaging over different voxels. This averaging reduces the image resolution and increase the integration time for the processing. The use of the median value in the maximum likelihood method significantly reduces false indication of voxels with spuriously large values of Z and can be used to produce statistically inferred values of Z that are sufficiently close to the values used in the Monte Carlo scattering simulation that assignments of voxels to the low, medium or high Z groups are unambiguous with high confidence.

Figure 8:
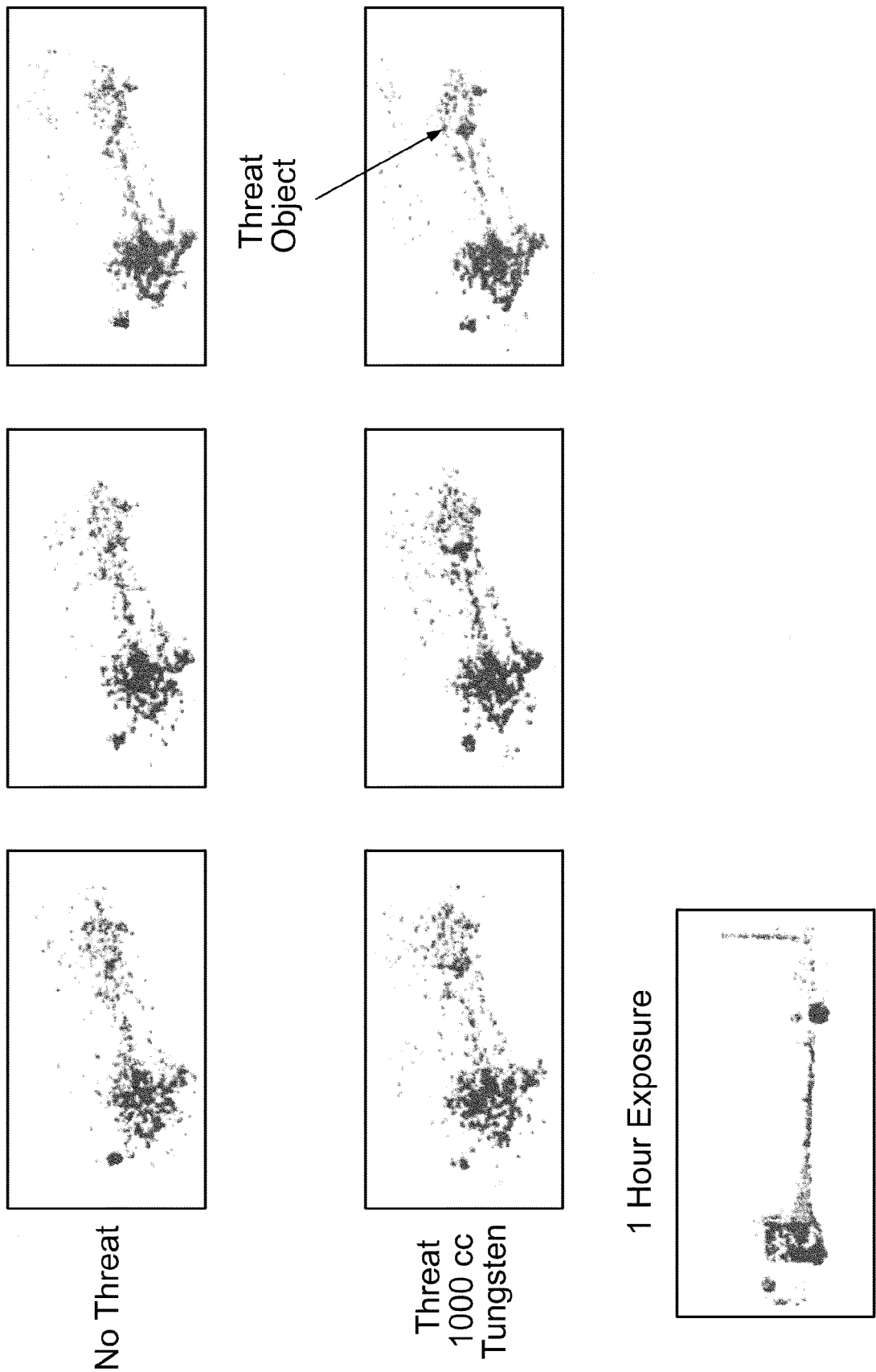
Figure 9A:
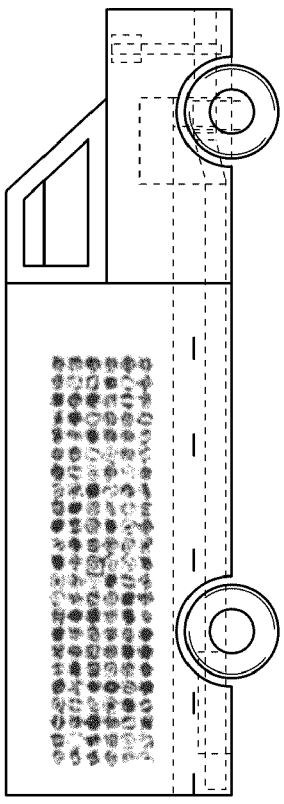
FIGS. 9, 10 and 11 show vehicle models and respective muon tomography images of the vehicles models.
Figure 9B:
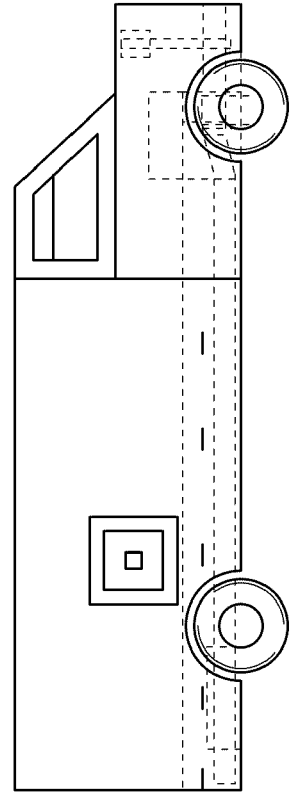
Figure 9C:
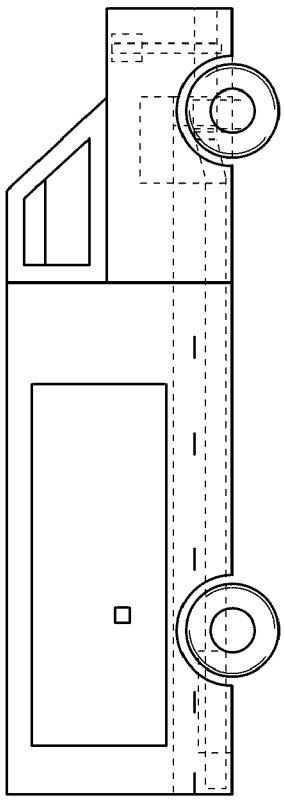
Figure 9D:
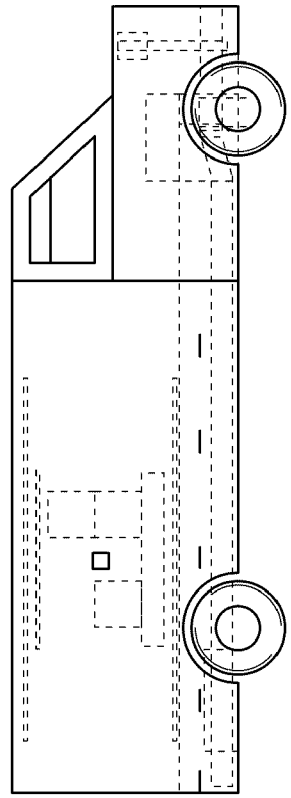
Figure 10B:
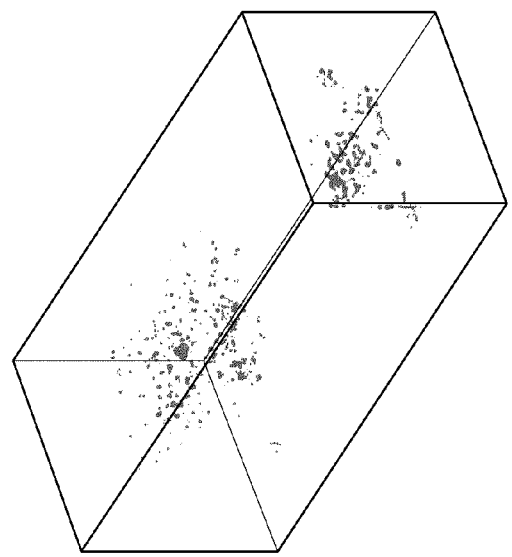
Figure 10D:
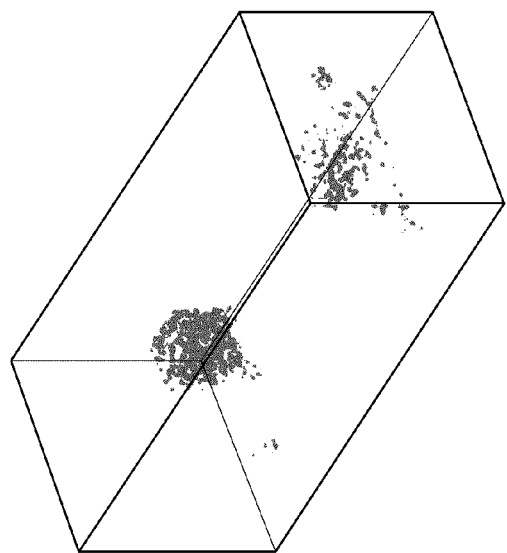
Figure 10A:
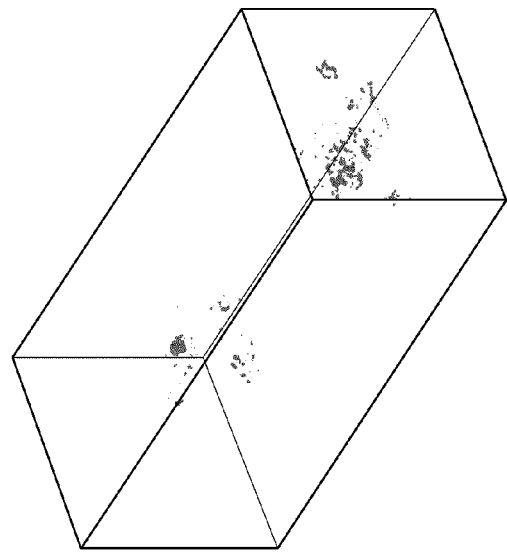
Figure 10C:
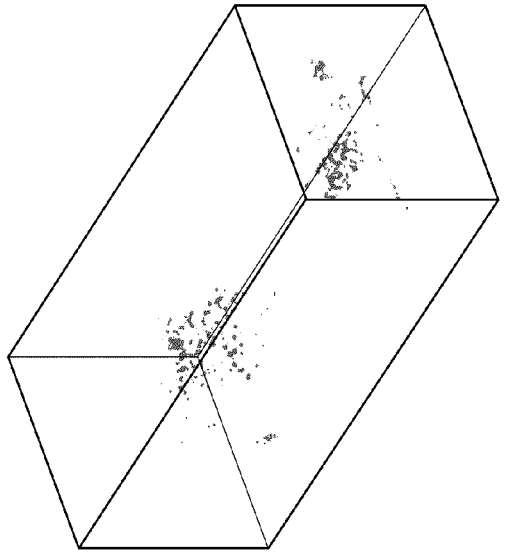
Figure 11A:
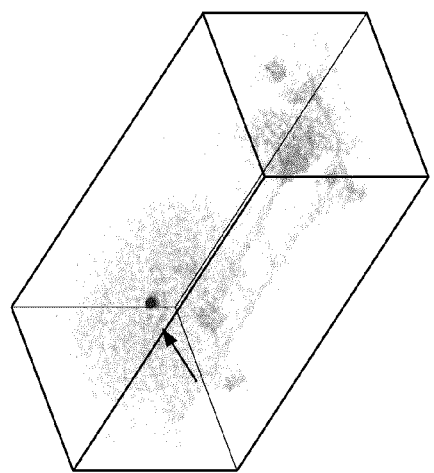
Figure 11B:
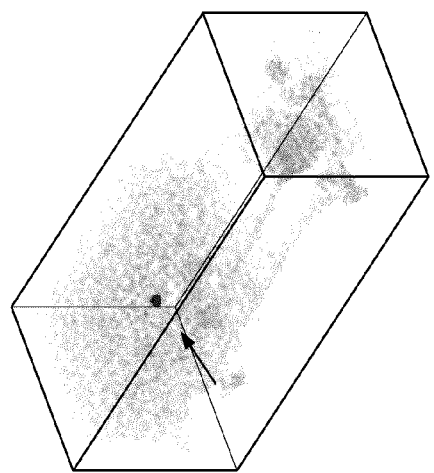
Figure 11C:
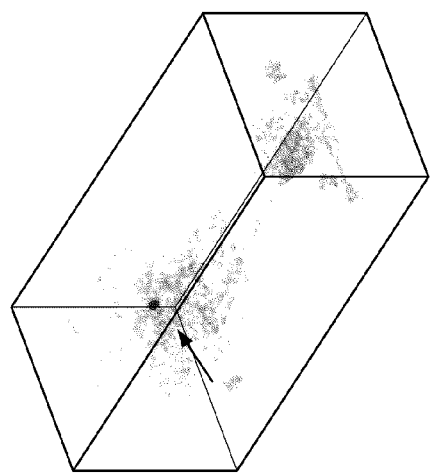
Figure 11D:
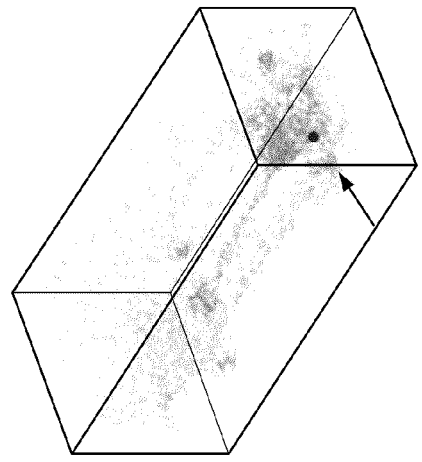
Figure 11E:
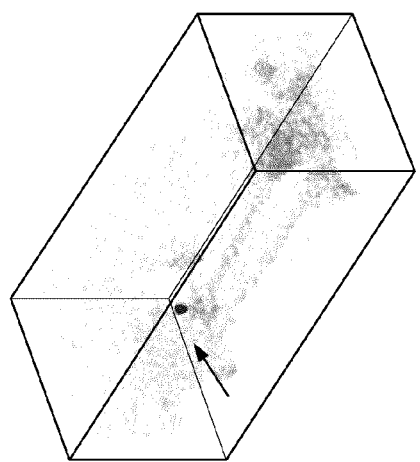

FIG. 8 shows additional examples of muon tomography images of a van at different integration times from a muon tomography detection system. In each image in FIG. 8, a van is filled with a large volume of interfering matter. The reconstruction is based on the median maximum likelihood method. The images in the upper part are for a van without carrying a threat object and the images in the lower part are for a van that carries a threat object near the rear axle of the van.

FIGS. 9, 10 and 11 show vehicle models and respective muon tomography images of the vehicles models. FIG. 9 shows four scenes a) a 3-foot high stack of 4'×8' sheets of borated plywood about 1800 kg; b) a box of clutter; c) a welding machine with two 0.75 inch steel plates, top and bottom, included in order to try to spoof the reconstruction technique; and d) a steel box with 4" thick walls filled with neutron shielding. The box of clutter includes reduced density concrete powder (0.5 g/cm3) filled with randomly placed objects of 4 different shapes: half of a sphere, rectangular block of 2 different sizes and a parallelepiped. Each individual piece of clutter is randomly placed, rotated and offset with respect to the center of the given piece of clutter. The material for each of the pieces is randomly assigned to be various clutter material such as plastic, glass, and steel. The total weight of the scene is approximately 3200 kg. A special three layer container made of a composite shield is placed in the van and contains a nuclear material hidden from passive counting with medium mass materials. FIG. 10 shows the simulated reconstructions made from one-minute cosmic ray muon exposures. The threat object is distinguished in a), b) and c). FIG. 11 shows additional simulated reconstructions.

Figure 12:
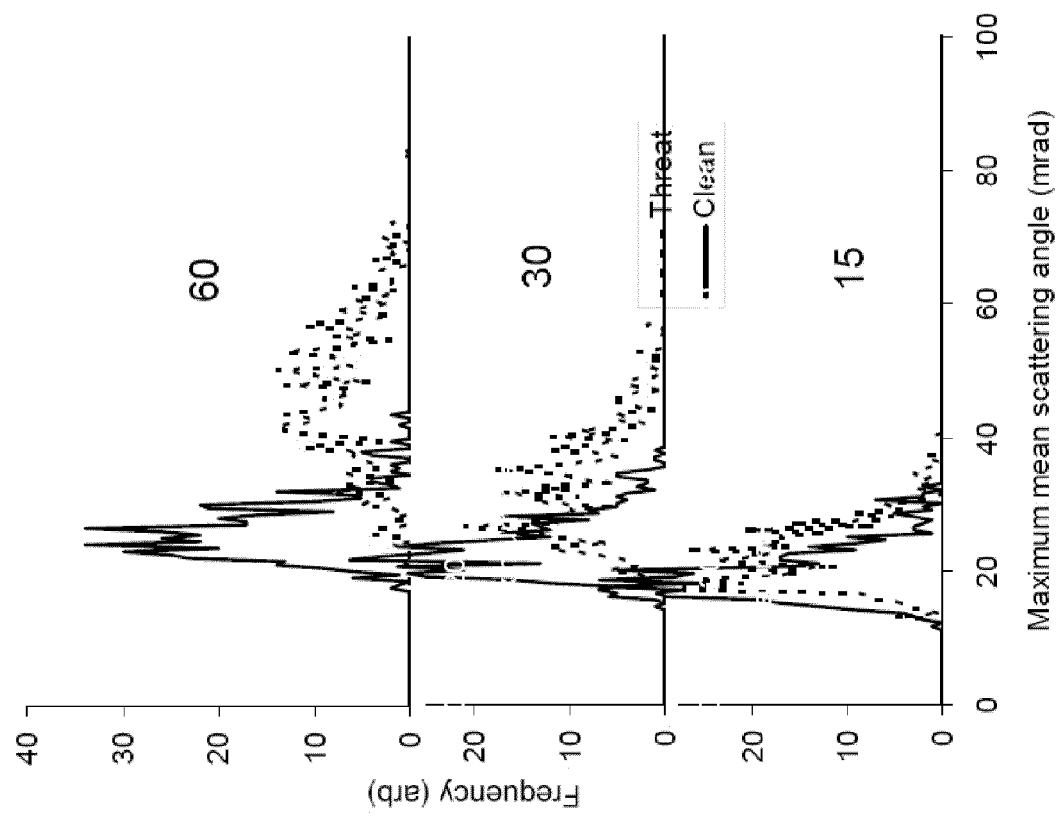
FIG. 12 shows histograms of the maximum value for the average reconstructed density in van scenes shown in FIG. 11.

Automatic identification of threat objects has been studied by calculating the average reconstructed scattering density for all possible 10 cm cubes from the 5 cm voxels. The maximum values of this quantity for 100 simulations and reconstructions performed for each of the 5 scenes shown above plus their empty counterpart for exposure times ranging from 15, 30, and 60 seconds are shown in FIG. 12. As the exposure time increases the threat objects become better separated from the innocuous cargo scenes. The impact of momentum uncertainty has been estimated by adding Gaussian distributed uncertainty to the perfect momentum, and then performing reconstructions and calculating receiver operator characteristic (ROC) curves. The time needed to obtain similar ROC curves is increased by about 50% when 50% momentum knowledge (obtained from four residual measurements in the tracking detectors) rather then perfect knowledge is assumed. The robustness of the median reconstruction method reduces the statistical impact of imperfect momentum knowledge.

Figure 13:
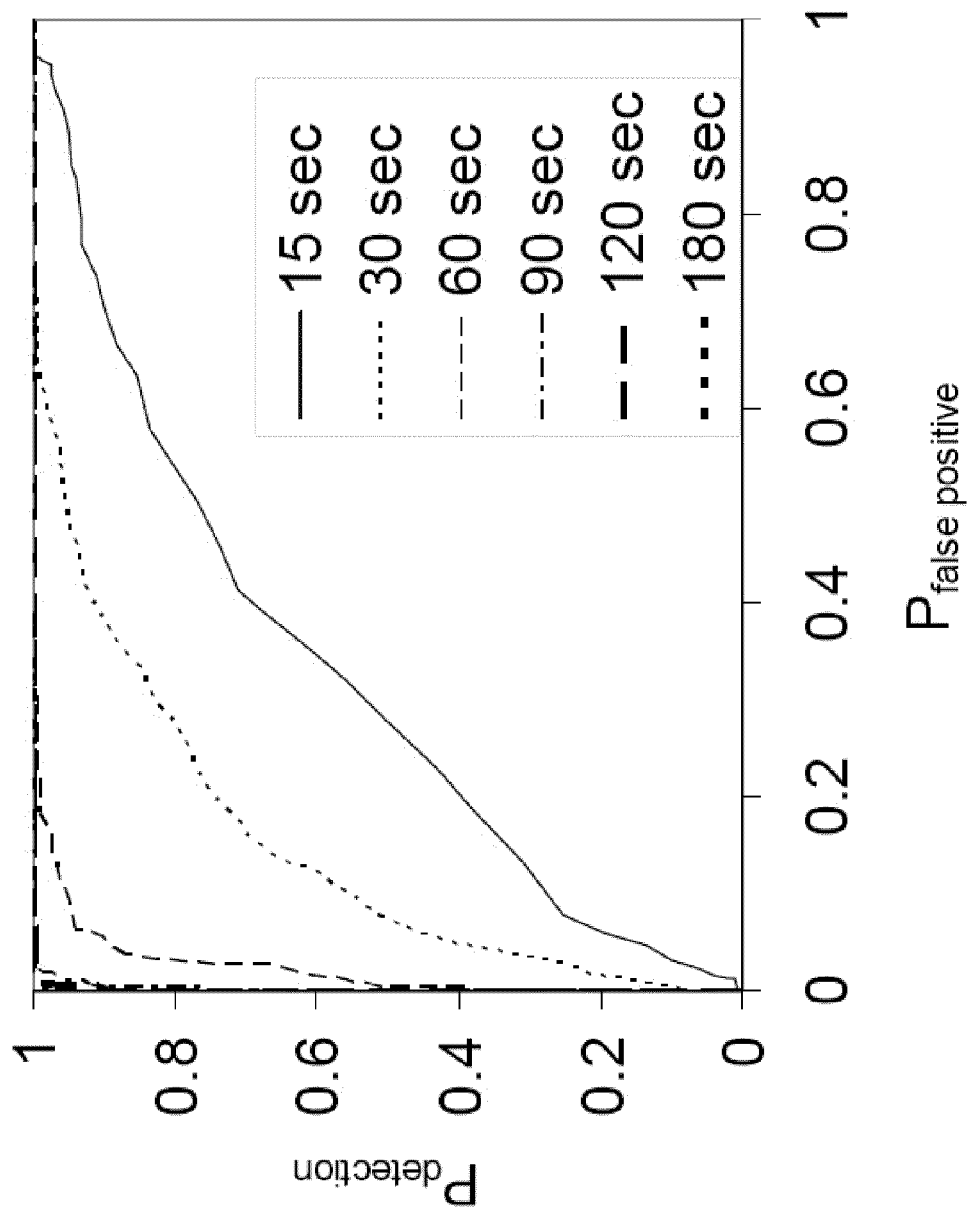
FIG. 13 shows eight voxel ROC curves for the set scenes shown in FIG. 11, where the ROC curves were generated using 1000 independent simulations at each of the time shown in the legend.

These reconstructions are used to generate ROC curves. ROC curves show the relationship between the false positive rate vs. the detection rate for threat objects as the threshold is varied. The ROC curves indicate that innocent vehicles can be identified with as little as 15 seconds of counting time. By 90 seconds the identification is very good. The analysis of the layered object and differences between the ROC curves for an object under the engine and above the differential has led to an improved technique for regularizing the reconstructions. We have found that heavily regularizing for longer exposures tends to reduce the signal from the threat objects when they are located near a feature such as the engine or inside of the iron box of the layered object. For short exposures, regularization is important for reducing the noise in innocuous scenes in order to reduce the number of unresolved false-positives. A technique which uses heavy regularization at short exposures and little or no regularization at late times has been found to give better results than fixed regularization. Using this method gives the ROC curves shown in FIG. 13.

Figure 14:
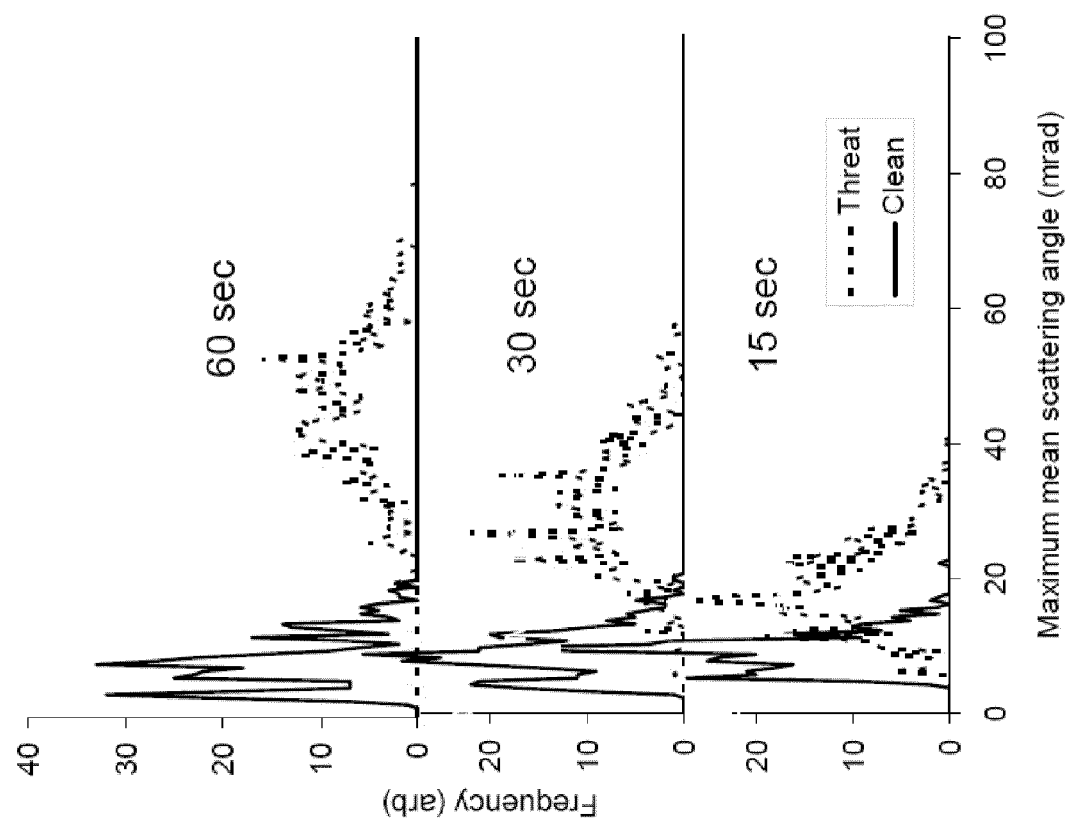
FIGS. 14, 15 and 16 illustrate muon tomography techniques based on prior knowledge and subtraction of a known reference background image.
Figure 15:
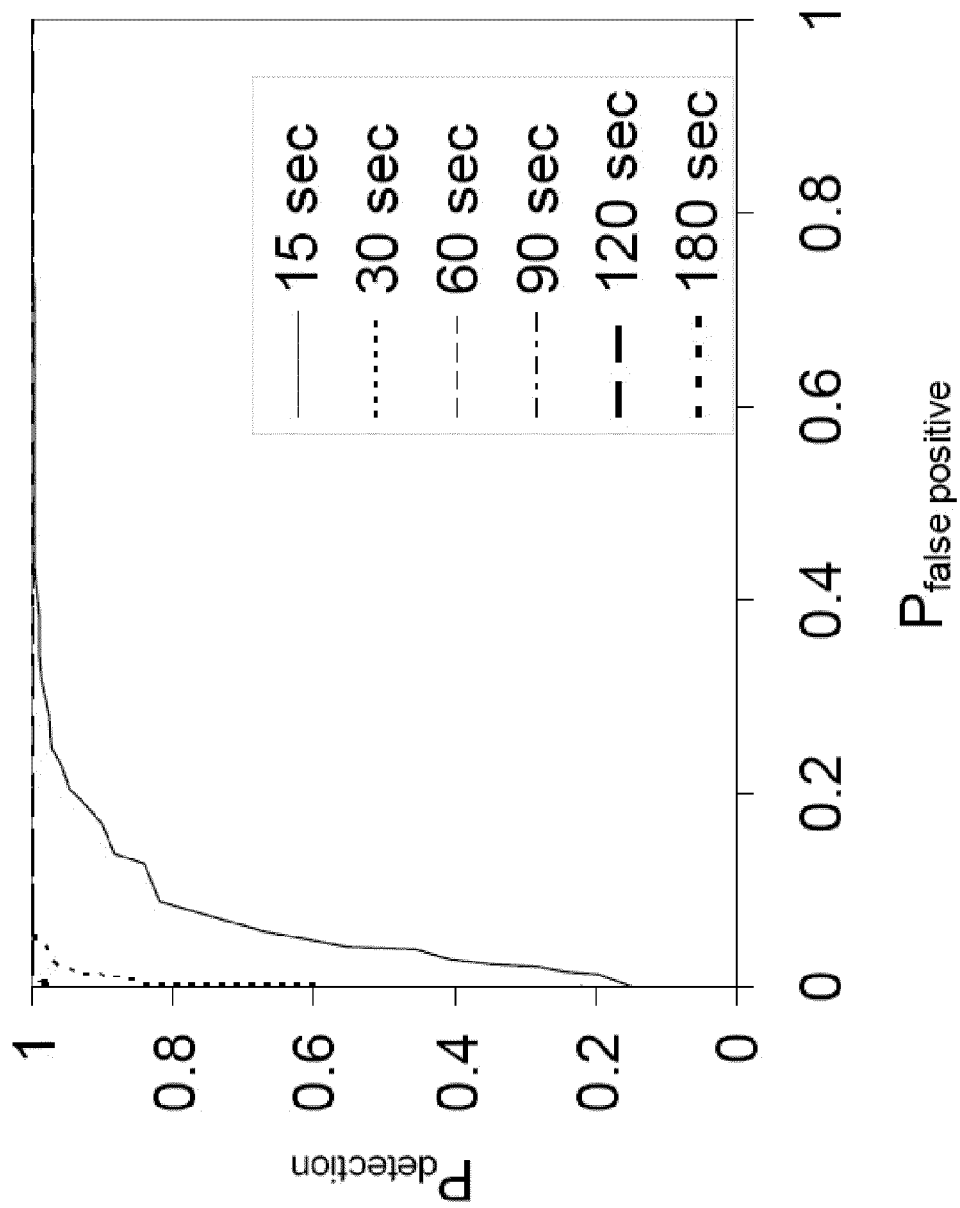
Figure 16:
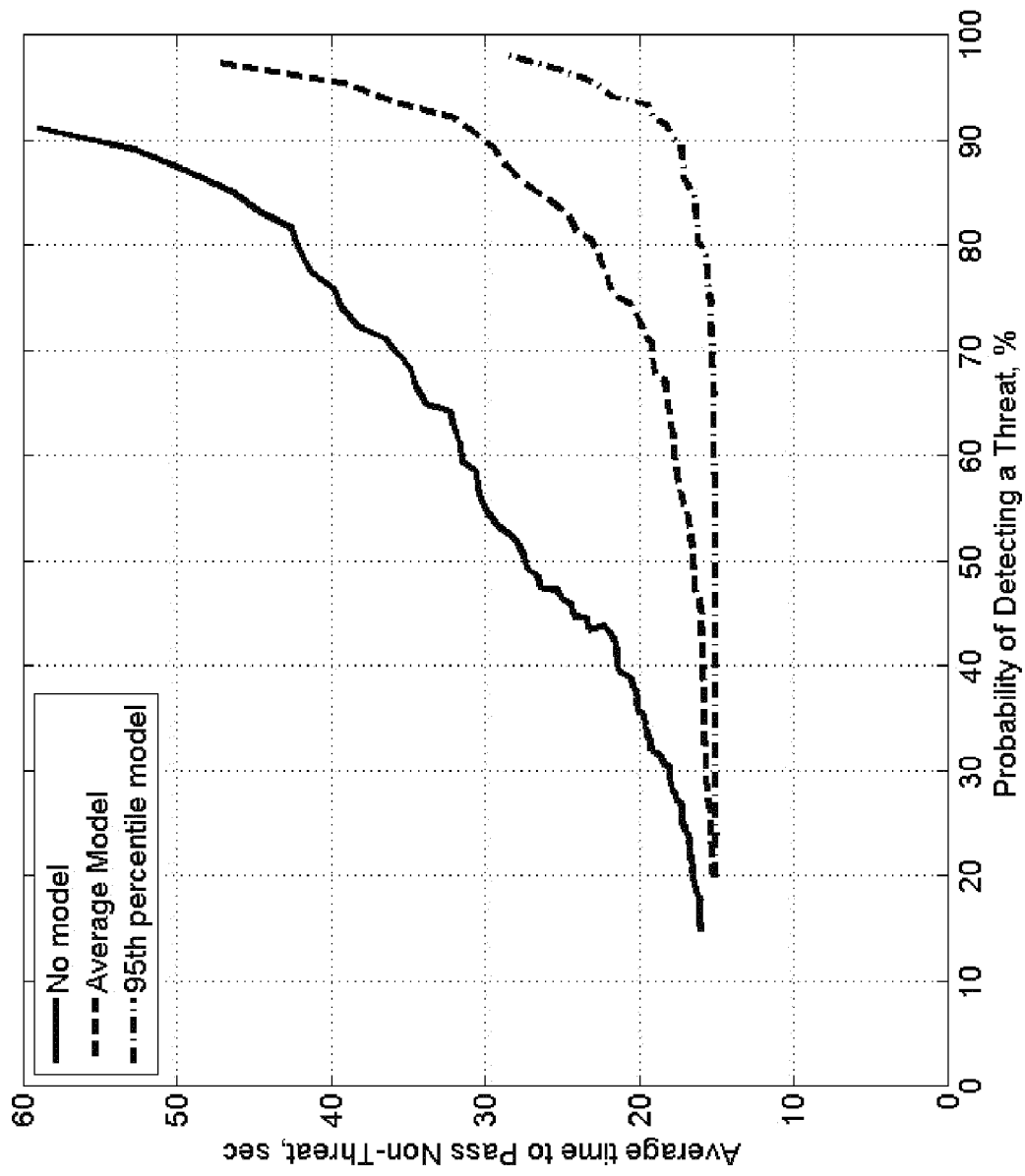

The use of prior knowledge considerably speeds up identification of threat objects. When prior knowledge was not assumed and 50% momentum knowledge was used, 90% detection with zero false positives on the data set used for these ROC curves requires ~60 second counting times. When an average of many reconstructions of an empty van for a given time are averaged and subtracted from the cargo scenes the rate of false positives for short scanning times is significantly reduced. A deployed device would have equivalent information about common vehicle models in a data base. Histograms of the maximum reconstructed values obtained using 3 sigma subtraction (the average empty van reconstruction plus 3 times the standard deviation in a set of statistically independent reconstructions for a given scanning time is subtracted voxel by voxel) are shown below in FIG. 14 and ROC curves are shown in FIG. 15. With this procedure the 30 second ROC curve becomes nearly perfect. Plots of the required inspection times are shown in FIG. 16 which compares average inspection times using no prior knowledge (solid line), straight subtraction (dash line) and 3 sigma subtraction (dot-dash line) for the mix of scenes described above.

The dashed curve shows the results that are obtained when the average of many empty van scenes is subtracted from each run before the ROC curve is calculated. This reduces the average level of the signal from the innocuous scenes and results in a factor of two reduction in average scanning time. The dot-dash curve is obtained by subtracting the average signal plus three standard deviations (three sigmas) from the reconstruction at each time. This over subtracts in regions of high density where statistical fluctuations leading to false positives are most likely. This method reduces inspection times by nearly an additional factor of two.

Ambiguity in attribution of scattering signal to appropriate voxel neighborhoods produces consistent effects at discrete exposure times, but is not easily characterized over time. One solution is to develop independent background models for discrete exposure times. Exposure time dependent background models can then be subtracted from a reconstruction being performed on a scene.

For each discrete exposure time, a set of background reconstructions is built based on scans of innocuous scenes. This background set should include as many reconstructions of innocuous scenes as possible, but is effective with as few as 50-100 scanned scenes. Different ways of combining the information from the background dataset can be implemented. Examples include building the background model by averaging each voxel's reconstructed value from each reconstruction in the background dataset, finding the median reconstructed value, and finding the 95th percentile value. The background model can be built based on prior knowledge by either using a modeled reconstruction or using a measured reconstruction of an innocuous scene such as an empty vehicle or container.

To properly combine the results of scans of innocuous scenes into a background model, the position and orientation of the scanned vehicle or container must be known relative to the scanner coordinate system. The precision of this measurement needs to be of the same order as the expected resolution of the muon tracking in the volume of interest, e.g., 1 cm to 2 cm.

Once a background model is developed, the subtraction can be performed in the imaging processing. The value of a voxel in the background model is subtracted from the reconstructed value for that voxel in a considered scene. Calculation of the probability of the presence of a threat proceeds as without background model. Thresholds are applied to the background subtracted scattering densities and the probability of the presence of a threat is calculated from the number of and the degree to which voxels are found over threshold.

Full physics particle transport calculations have been performed on several cargo configurations within a simulated Ford Econoline van. In these calculations, muon scattering datasets were generated based on muon interactions with material in the scene. Scenes included an empty van, the van with several cargoes, and these same scenes with a high density threat object (10 cm cube of tungsten) placed in the scene. Background models were developed based on 100 simulated scans of the empty van for several discrete exposure times. These background models were then applied to 100 reconstructions of each of the other scenes and background corrected ROC curves generated.

Figure 17A:
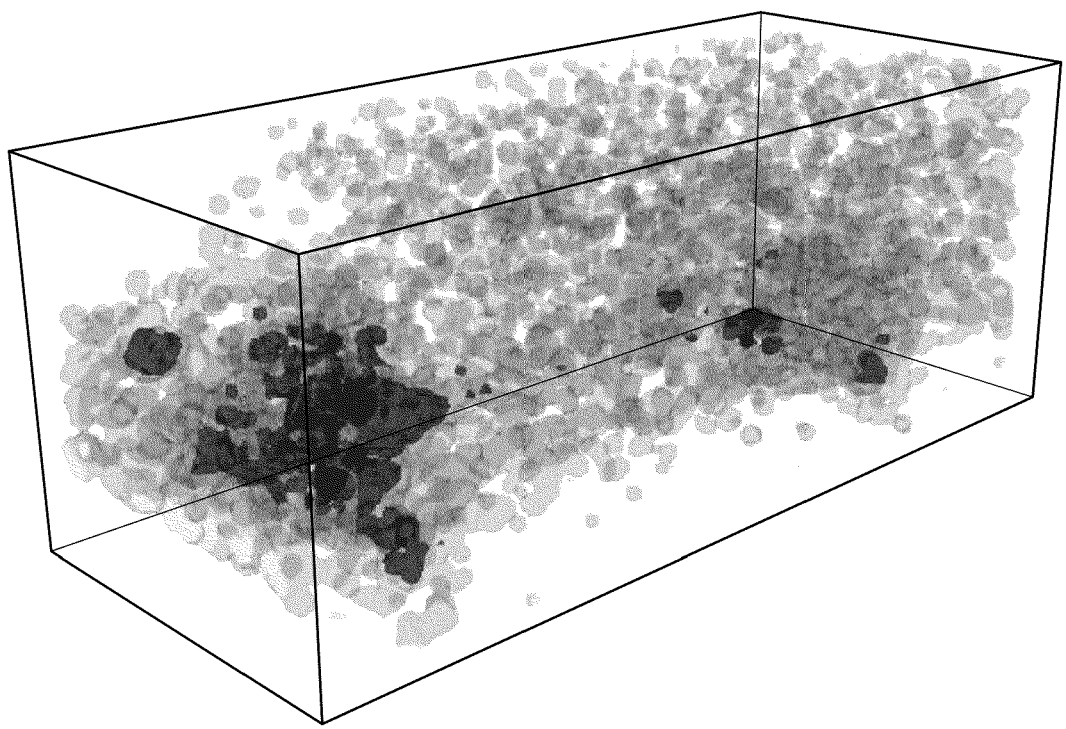
FIGS. 17A, 17B, 18A, 18B, 19A-19C, 20 and 21 illustrate additional examples of muon tomography techniques based on prior knowledge and subtraction of a known reference background image.
Figure 17B:
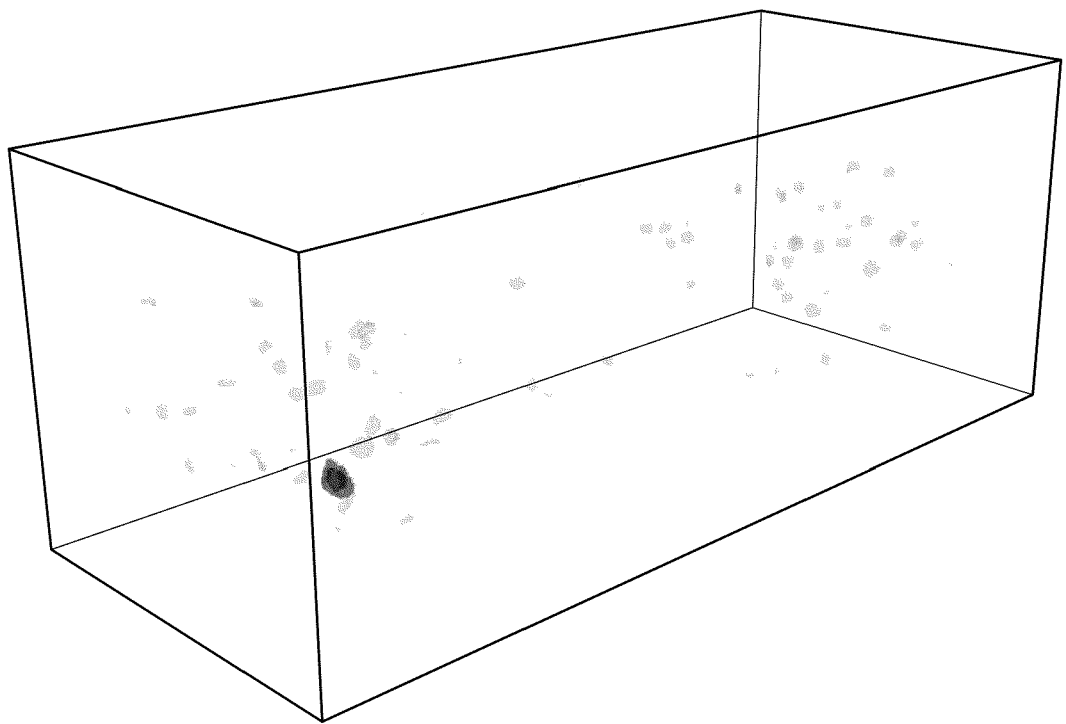

FIGS. 17A and 17B show simulated van exposure with a 10 cm tungsten block under engine before and after background subtraction. The ratio of the threat object signal strength to the background is greatly increased by applying prior knowledge of the vehicle components. The background model in FIG. 17B is based on the 95th percentile background model.

Figure 18A:
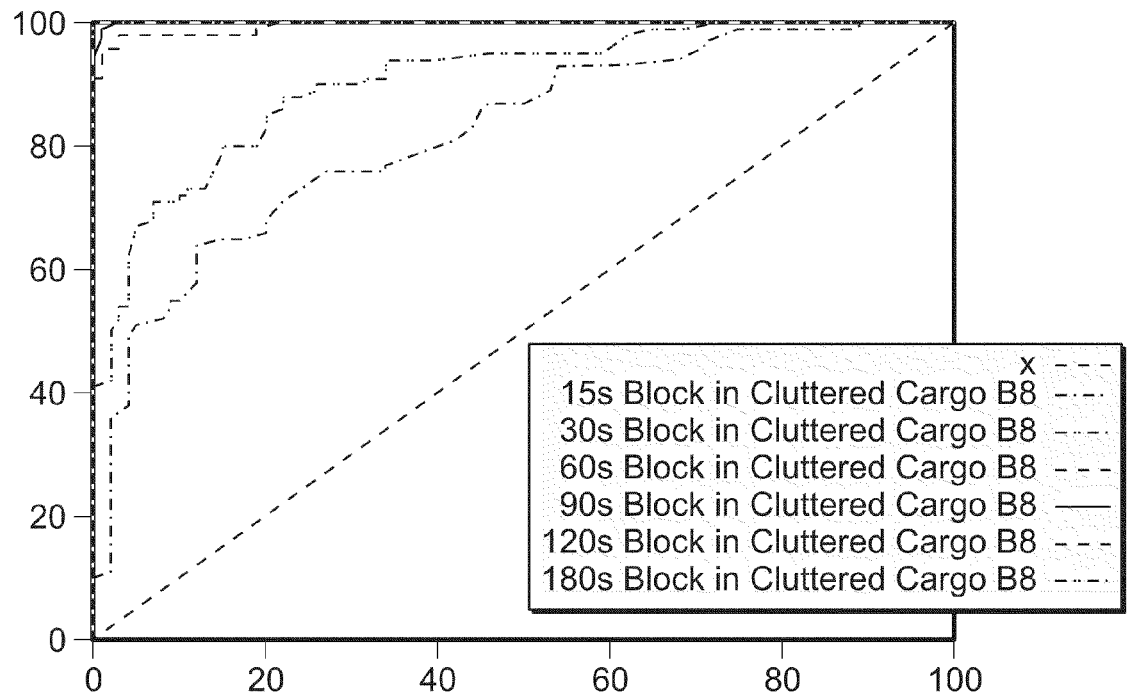
Figure 18B:
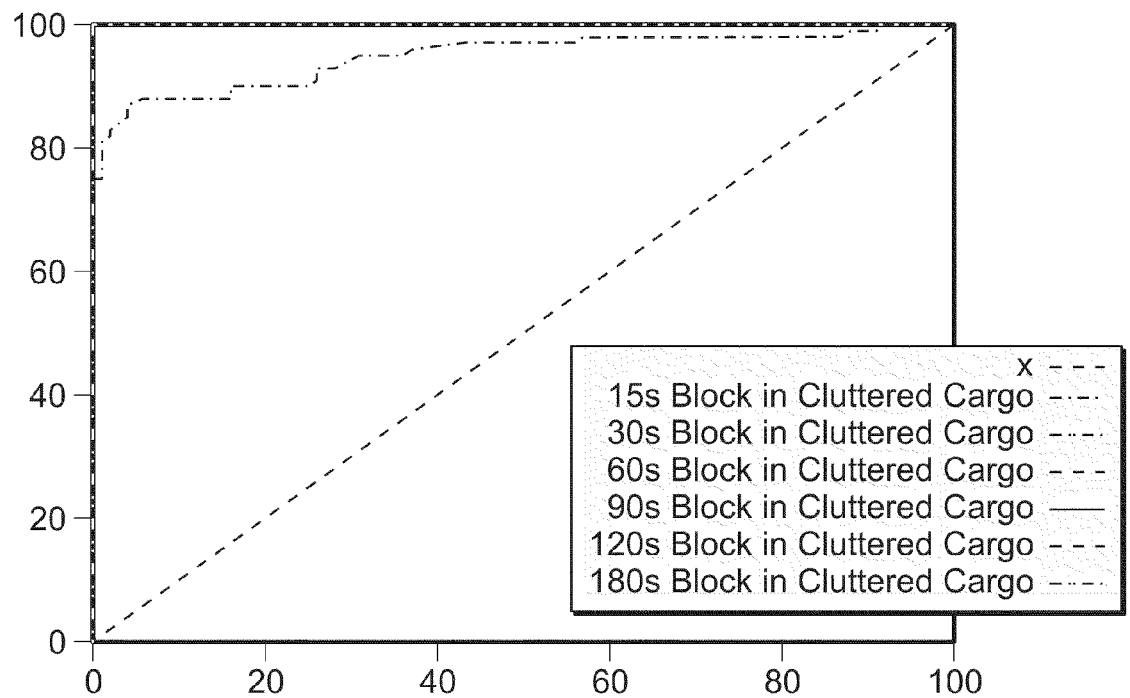

The ROC curves calculated for sets with and without application of the 95th percentile background model are shown in FIGS. 18A and 18B. The simulated exposures were for the van with 10 cm tungsten block hidden in mixed cargo of concrete, steel and aluminum before and after background subtraction. The ROC curves for the background subtracted scenes, even with complicated cargo that is not begin subtracted, show a much higher probability of detection and much lower probability of false alarms at each discrete exposure time.

These ROC curves were analyzed to calculate average exposure times for 95% confidence scanning and these were compared to times calculated without application of background models. Average scan times versus detection probability are plotted in FIG. 16. The calculations were from several hundred simulated scans with various cargos including plywood, concrete and heavy steel equipment. This application of prior knowledge greatly reduces the average scan time for a given probability of detection. For example, the application of the 95th percentile model reduces average scan times for 95% confidence scanning from over a minute to less than 30 seconds.

A study of the efficacy of the use of prior knowledge in a reconstruction was performed using a muon tomography system. In this study, a 6-cylinder car engine was placed in the scanner and a $95^{th}$ percentile background model developed from 100 1-minute scans. Scans were performed with a 10 kg mass of lead placed on the engine, the model applied and ROC curves developed.

Figure 19C:
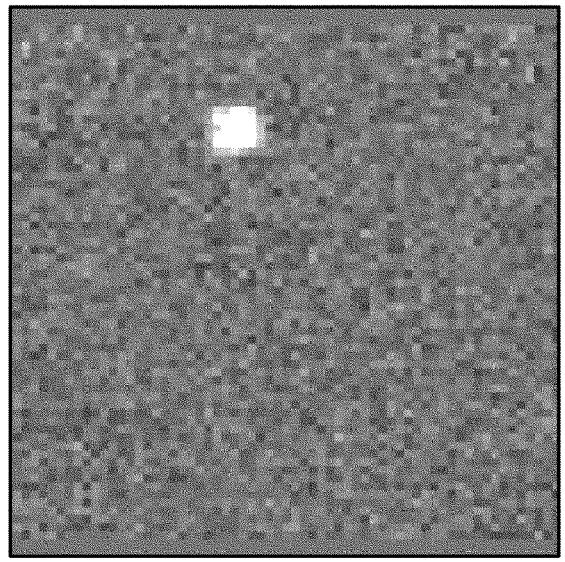
Figure 19B:
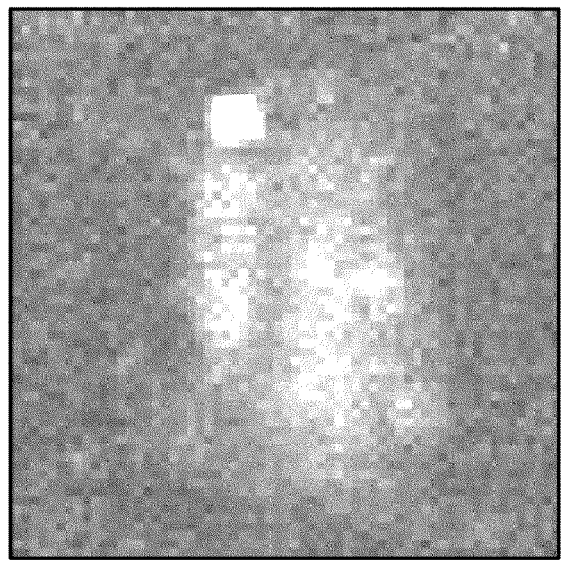
Figure 19A:
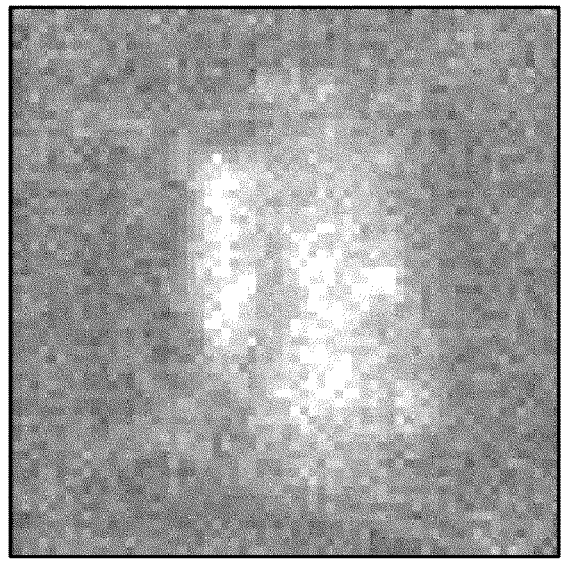

FIGS. 19A, 19B and 19C show an actual muon reconstruction from data taken in a muon tomography system in this study. FIG. 19A shows an example of the muon tomography image of the background for the background model. FIG. 19B shows the muon tomography image of the scene with the lead object. FIG. 19C shows the reconstructed scene after the application of the background model.

Figure 20:
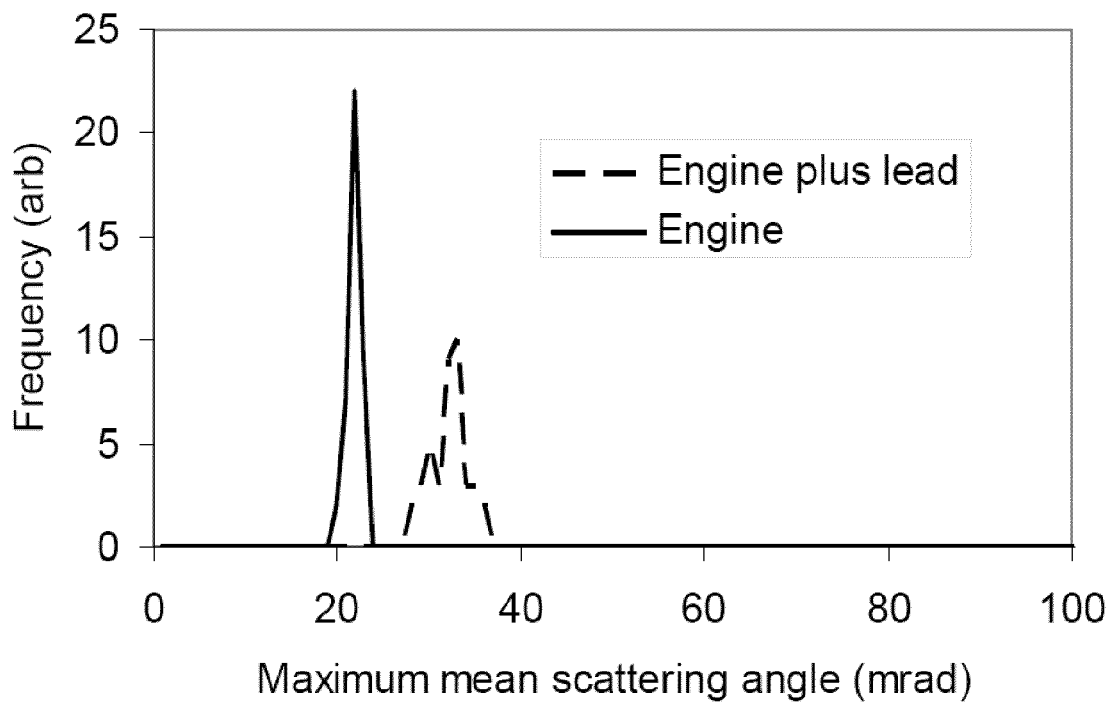
Figure 21:
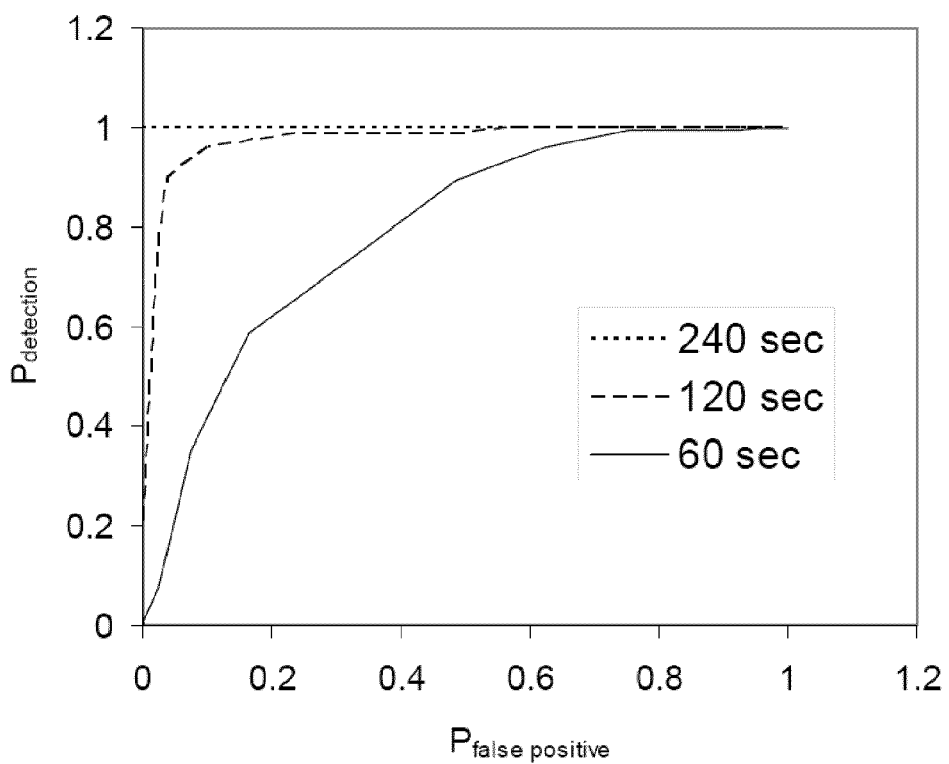

The muon tomography data set was divided into 1, 2, and 4 minute intervals, and analyzed each independently. The average picture from the long run with only the engine was subtracted from each of the individual short runs, and the maximum 10×10×10 cm3 voxel value was histogramed for all of the runs with and without the lead. These histograms, an example is shown in FIG. 20, were used to calculate the ROC curves, shown in FIG. 21.

Average scan times for automatic threat detection with 95% confidence were reduced from an exposure time greater than 10 minutes without prior knowledge of the background component of the scene to a significantly shortened exposure time of less than 4 seconds when the average background model was applied to perform the background subtraction. The application of a model of innocuous background components to three-dimensional re-constructions is shown to greatly reduce the average scan time for clearing scenes of high-Z threat objects, without decreasing the effectiveness of the scanner. The 95th percentile model is effective and its operation effectively accounts for concentration of scattering signal into small regions with short exposure times.

Muon tomography can be used to detect concealed certain materials such as high-Z materials and nuclear materials by detecting the shielding containers that are used to conceal such materials. In addition, muon tomography can detect objects constructed from innocuous materials, such as steel, that have distinctive shapes, such as artillery shells. This detection approach uses shapes of objects present in the muon tomography images to identify certain targeted objects. This shape recognition approach allows the muon tomography imaging to be used in a wide range of detection applications beyond detecting high-Z or medium Z materials.

Figure 22:
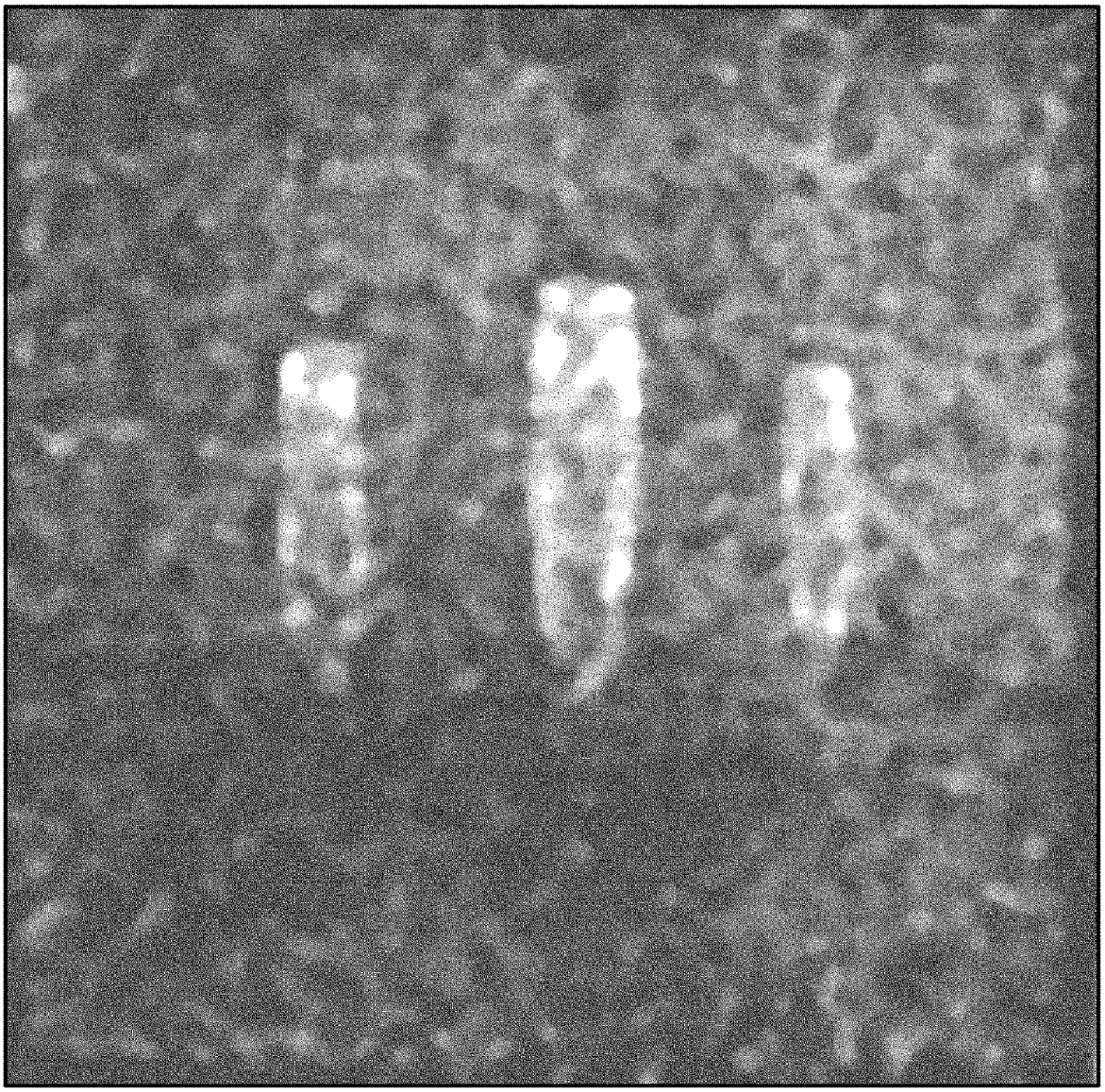
FIGS. 22 and 23 illustrate detecting suspect objects based on shape recognition in muon tomography images.
Figure 23:
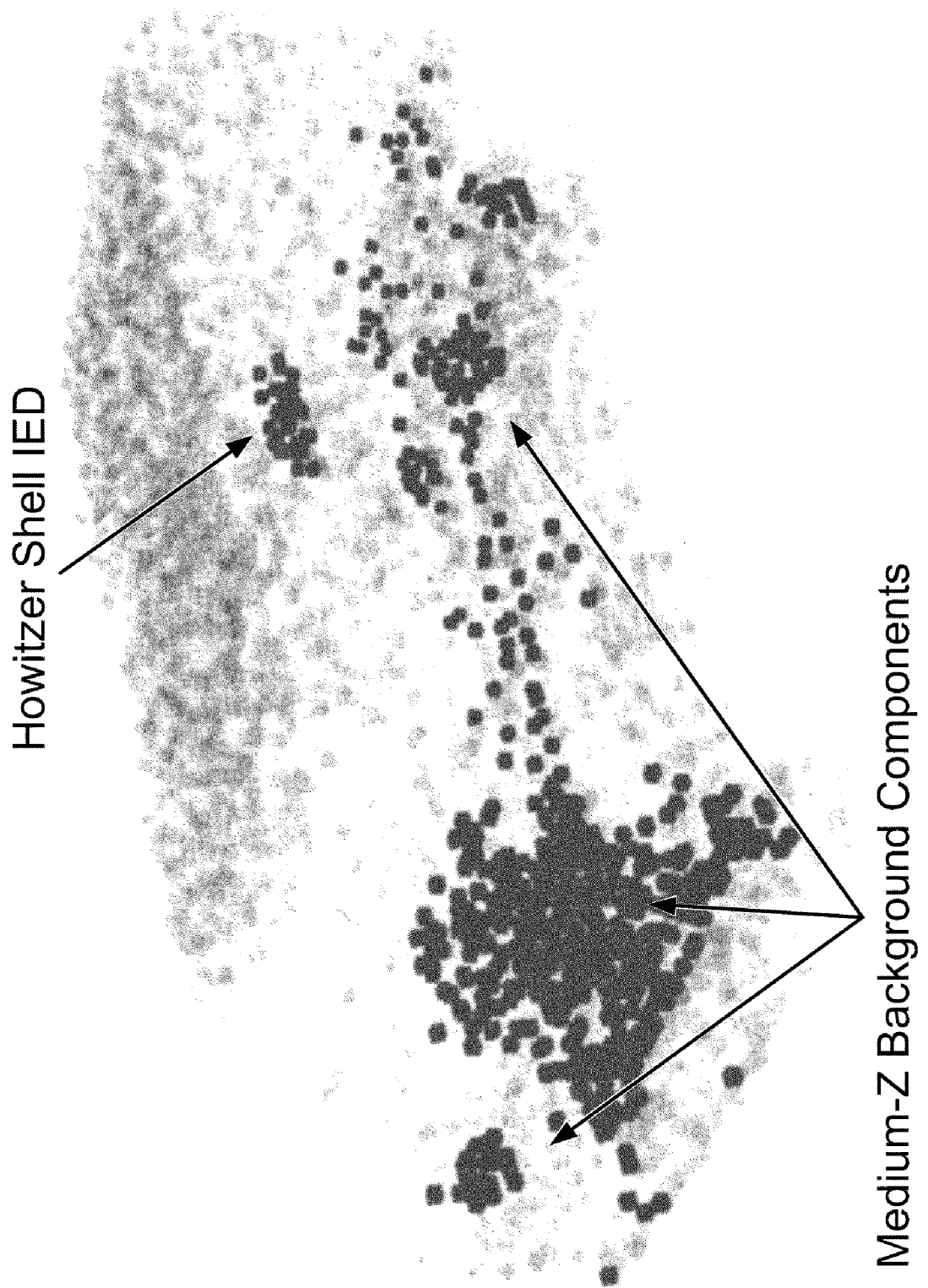

FIG. 22 shows an example of a scattered angle image of artillery shells obtained from a muon tomography system. FIG. 23 shows a reconstruction showing an artillery shell with a background. In operation, the reconstruction of an muon tomography image is analyzed to recognize shapes formed by materials of different Z values. The recognized shapes are separated from the surroundings in the image and are either digitally compared to some reference shapes to determine a match or visually inspected by an operator to determine a match.

Computationally fast reconstructions of muon tomography data can be performed by information provided by the closest approach point between the incoming and outgoing trajectories (PoCA), the closest approach distance between incoming and outgoing trajectories (DoCA) and the angle between the incoming and outgoing trajectories. The covariance of the angle and the DoCA can be used to calculate the thickness of the material.

Figure 24:
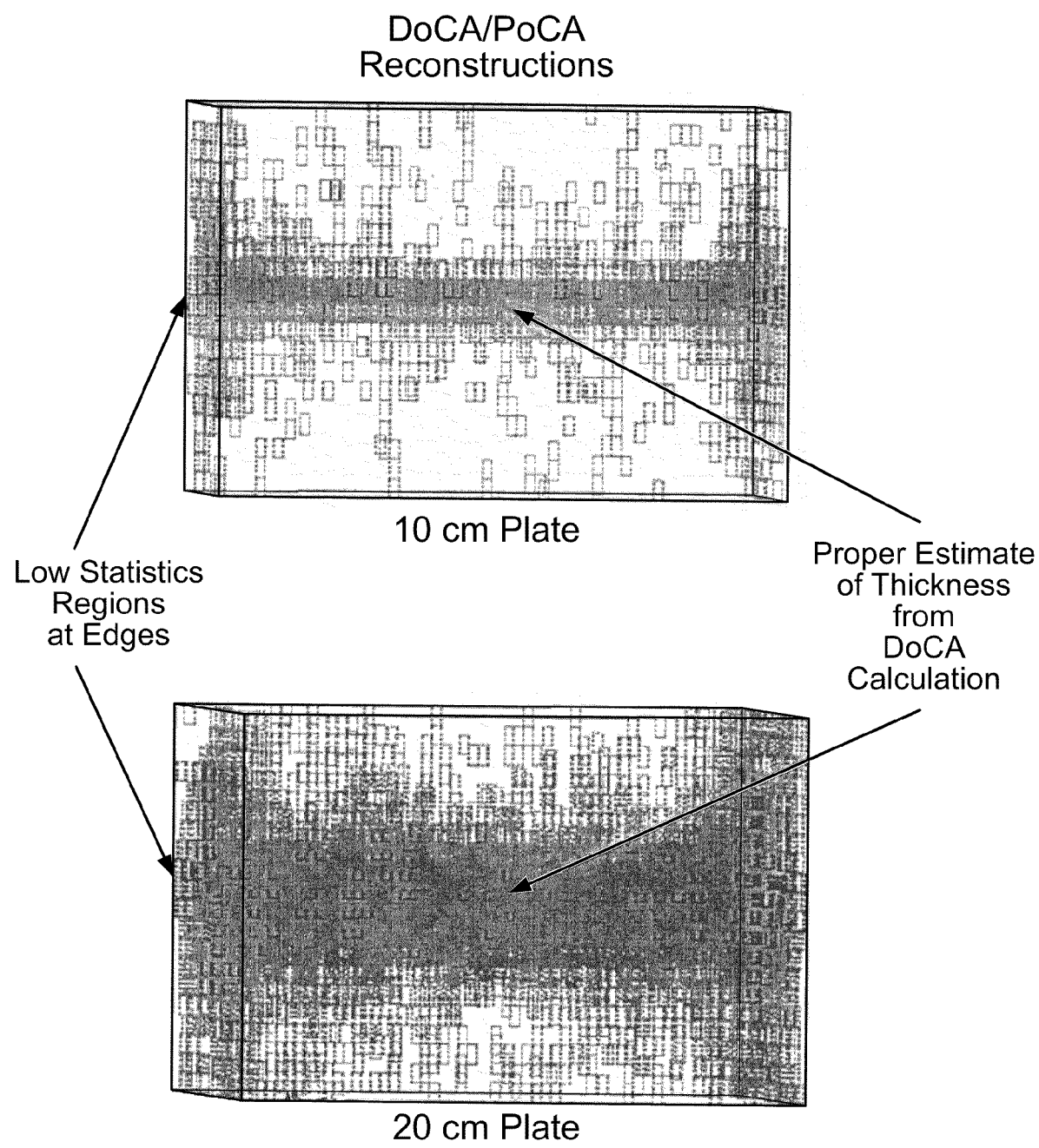
FIG. 24 shows examples for using trajectory information of muons to determine the thickness of the material.

FIGS. 24A and 24B show two examples for using trajectory information of muons to determine the thickness of materials based on muon tomography. Arrays for each voxel along the incoming and outgoing trajectories symmetrically around the PoCA position according to the calculated thickness are appended with a value that depends on the scattering angle. After the entire muon dataset is considered, the median is taken of the array for each voxel and that value assigned for the reconstruction.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations and enhancements may be made.

What is claimed is:

1. A muon tomography system that detects threat in an object, cargo or vehicle under inspection, comprising:
    a first set of position sensitive muon detectors located on a first side of an object holding area to measure positions and directions of incident muons towards the object holding area;
    a second set of position sensitive muon detectors located on a second side of the object holding area opposite to the first side to measure positions and directions of outgoing muons exiting the object holding area;
    wherein each of the first and second sets of position sensitive detectors is structured and arranged to allow at least three charged particle positional measurements in a first direction and at least three charged particle positional measurements in a second direction different from the first direction, and
    a signal processing unit to receive data of measured signals of the incoming muons from the first set of position sensitive muon detectors and measured signals of the outgoing muons from the second set of position sensitive muon detectors, the signal processing unit configured to analyze scattering behaviors of the muons caused by scattering of the muons in the materials within the object holding area based on the measured incoming and outgoing positions and directions of muons to obtain a tomographic profile or the spatial distribution of scattering centers within the object holding area, and to generate an obtained cosmic muon image of the object, cargo or vehicle under inspection,
    wherein the signal processing unit is operable to subtract a reference cosmic muon image that represents a background of an object, cargo or vehicle under inspection in the object holding area from the obtained cosmic muon image of the object, cargo or vehicle under inspection to obtain a subtracted image; and process the subtracted image to determine whether the object, cargo or vehicle under inspection contains a target object that is absent from the reference cosmic muon image, and
    wherein the signal processing unit is configured to generate the subtracted image after a short exposure time of data collection by the first and second sets of position sensitive detectors for generating the obtained cosmic muon image of the object, cargo or vehicle under inspection, wherein the short exposure time is insufficient for using the obtained cosmic muon image to fully isolate and identify the target object from the background of the object, cargo or vehicle under inspection in the object holding area in absence of the subtracted image based on the reference cosmic muon image, and the signal processing unit is configured to indicate a threat when the subtracted image is at or exceeds a threshold for a threat.

2. The system as in claim 1, wherein:
the signal processing unit uses a distribution of atomic number Z in the obtained muon tomographic images and a distribution of atomic number Z in the reference cosmic muon image to detect presence or absence of the target object.

3. The system as in claim 1, wherein:
the reference cosmic muon image is based on averaging reconstructed values of each voxel in muon tomography imaging data.

4. The system as in claim 1, wherein:
the reference cosmic muon image is based on a median reconstructed value of reconstructed values of each voxel in muon tomography imaging data.

5. The system as in claim 1, wherein:
the reference cosmic muon image is based on a predetermined percentile value of reconstructed values of each voxel in muon tomography imaging data.

6. The system as in claim 5, wherein:
the predetermined percentile value is the 95th percentile value.

7. The system as in claim 1, wherein:
the reference cosmic muon image is constructed based on prior knowledge on the object, cargo or vehicle under inspection.

* * * * *